(12) United States Patent
Shima

(10) Patent No.: US 9,505,898 B2
(45) Date of Patent: Nov. 29, 2016

(54) EXPANDABLE COMPOSITE RESIN BEAD

(71) Applicant: JSP CORPORATION, Chiyoda-ku (JP)

(72) Inventor: Masaomi Shima, Mie (JP)

(73) Assignee: JSP CORPORATION, Chiyoda-ku (JP)

(*) Notice: Subject to any disclaimer, the term of this patent is extended or adjusted under 35 U.S.C. 154(b) by 35 days.

(21) Appl. No.: 14/508,016

(22) Filed: Oct. 7, 2014

(65) Prior Publication Data

US 2015/0105483 A1    Apr. 16, 2015

(30) Foreign Application Priority Data

Oct. 11, 2013    (JP) .................... 2013-213379

(51) Int. Cl.
| | | |
|---|---|---|
| C08J 9/18 | (2006.01) | |
| C08J 9/00 | (2006.01) | |
| C08J 9/14 | (2006.01) | |
| C08J 9/232 | (2006.01) | |
| C08L 23/08 | (2006.01) | |

(52) U.S. Cl.
CPC ............ *C08J 9/18* (2013.01); *C08J 9/0061* (2013.01); *C08J 9/141* (2013.01); *C08J 9/232* (2013.01); *C08L 23/0815* (2013.01); *C08J 2201/026* (2013.01); *C08J 2203/14* (2013.01); *C08J 2203/202* (2013.01); *C08J 2205/052* (2013.01); *C08J 2323/06* (2013.01); *C08J 2325/06* (2013.01); *C08J 2325/14* (2013.01); *C08J 2423/08* (2013.01); *C08L 2203/14* (2013.01); *C08L 2205/04* (2013.01); *C08L 2312/00* (2013.01)

(58) Field of Classification Search
CPC ................ C08J 9/16; C08J 9/18; C08J 9/20
See application file for complete search history.

(56) References Cited

U.S. PATENT DOCUMENTS

| | | |
|---|---|---|
| 2006/0063847 A1 | 3/2006 | Matsumura et al. |
| 2006/0217452 A1 | 9/2006 | Inada et al. |
| 2009/0186954 A1* | 7/2009 | Okamura ............ C08F 255/026 521/60 |
| 2012/0149792 A1 | 6/2012 | Shima |
| 2014/0221517 A1 | 8/2014 | Shima et al. |
| 2014/0249240 A1 | 9/2014 | Shima |

FOREIGN PATENT DOCUMENTS

| | | |
|---|---|---|
| JP | 45-32623 | 10/1970 |
| JP | 1-284536 | 11/1989 |
| JP | 2007-321021 | 12/2007 |
| JP | 2013-112765 | 6/2013 |

OTHER PUBLICATIONS

Machine translation of JP 2007-321021 by Nakaguki et al.*
Extended European Search Report issued Nov. 27, 2014, in Patent Application No. 14188298.5.
U.S. Appl. No. 14/824,564, filed Aug. 12, 2015, Shima.

* cited by examiner

*Primary Examiner* — Mike M Dollinger
*Assistant Examiner* — Christina Wales
(74) *Attorney, Agent, or Firm* — Oblon, McClelland, Maier & Neustadt, L.L.P.

(57) ABSTRACT

An expandable composite resin bead comprises: a composite resin containing a polyethylene resin and a polystyrene resin; and a blowing agent impregnating the composite resin. The composite resin contains 5 to 20 mass % of the polyethylene resin and 80 to 95 mass % of the polystyrene resin. The blowing agent is an organic physical blowing agent. Furthermore, in the expandable composite resin bead, a predetermined swelling degree in methyl ethyl ketone at a temperature of 23° C. is not lower than 1.25.

14 Claims, 7 Drawing Sheets

EXPANDABLE COMPOSITE RESIN BEAD

CROSS-REFERENCE

This application claims priority to Japanese patent application no. 2013-213379 filed on Oct. 11, 2013, the contents of which are entirely incorporated herein by reference.

BACKGROUND OF THE INVENTION

Field of the Invention

The present invention relates to an expandable composite resin bead, which comprising a blowing agent and a composite resin containing a polyethylene resin and a polystyrene resin.

Description of the Background Art

A foamed resin molded article formed from expanded beads obtained through in-mold molding and mutual fusion-bonding of the expanded beads is widely used in applications such as for wrapping materials, building materials, impact absorbing materials, and the like, by utilizing excellent properties of the foamed resin molded article including buffering property, lightweightness, thermal insulation property, and the like. As the foamed resin molded article, those whose base resin materials include a polyolefin resin such as polypropylene and polyethylene or a polystyrene resin such as polystyrene are used.

When compared to a foamed polystyrene resin molded article formed from the expanded beads, a foamed polyolefin resin molded article formed from the expanded beads has excellent impact resistance, toughness, and post-compression restorability, and is therefore used as packaging materials and wrapping materials for precision components and heavy weight products etc. Furthermore, the foamed polyolefin resin molded article also has excellent heat resistance and oil resistance, and is therefore also used as automobile components such as impact absorbers, bumpers, and floor spacers. In such manner, the foamed polyolefin resin molded article is widely used in various applications.

However, although the foamed polyolefin resin molded article has excellent characteristics as described above, the foamed polyolefin resin molded article also has shortcomings including having low rigidity and requiring equipment such as special metal molds since the steam temperature upon in-mold molding is high, when compared to the foamed polystyrene resin molded article.

On the other hand, when compared to the foamed polyolefin resin molded article, the foamed polystyrene resin molded article is generally moderate in price, has low molding vapor pressure upon in-mold molding, and has fine processability, and is therefore widely used in the market. Furthermore, the foamed polystyrene resin molded article has excellent rigidity, and enables a high foam expansion ratio depending on the application. Thus, when compared to the foamed polyolefin resin molded article, the foamed polystyrene resin molded article is also advantageous in terms of lightweightness.

However, when compared to the foamed polyolefin resin molded article, the foamed polystyrene resin molded article also has shortcomings such as having inferior toughness and post-compression restorability.

In order to resolve shortcomings of both molded articles described above, for example, technologies described in the following have been developed.

More specifically, methods have been developed for obtaining modified polyethylene resin beads by impregnating polyethylene resin nuclear beads with a vinyl aromatic monomer, polymerizing the vinyl aromatic monomer, and crosslinking the polyethylene resin (cf. JP45-32623B2 and JP1-284536A).

In addition, a method has been developed for producing expandable polyethylene resin beads by preparing polyethylene resin nuclear beads from an acrylonitrile-styrene copolymer and a polyethylene polymer, impregnating the nuclear beads with a styrene monomer, polymerizing the styrene monomer, and impregnating the resin beads with a blowing agent (cf. JP2007-321021A).

SUMMARY OF THE INVENTION

However, with the methods of JP45-32623B2, JP1-284536A, and JP2007-321021A, although restorability of a foamed resin molded article can be improved, the restorability is still insufficient when compared to that of the foamed polyethylene resin molded article. Furthermore, rigidity is also not sufficient when compared to that of the foamed polystyrene resin molded article, and there is still room for improvement.

Specifically, with the methods of JP45-32623B2 and JP1-284536A, rigidity of the foam molded article can be improved by increasing the ratio of a vinyl aromatic monomer with respect to polyethylene resin beads. However, the ratio of the vinyl aromatic monomer has to be increased considerably for obtaining a degree of rigidity matching that of the foamed polystyrene resin molded article. As a result, properties of polyethylene are compromised, and the excellent restorability may not be obtained.

On the other hand, although expandable polyethylene resin beads obtained through the method of JP2007-321021A enable production of a foam molded product having excellent rigidity and restorability when compared to those of JP45-32623B2 and JP1-284536A, further improvement is desired.

The present invention has been made in view of such a background, and provides the expandable composite resin bead from which an expanded composite resin bead and a foamed resin molded article having both excellent rigidity and restorability can be obtained.

Means for Solving the Problem

One aspect of the present invention resides in an expandable composite resin bead comprising: a composite resin containing a polyethylene resin and a polystyrene resin; and a blowing agent impregnated in the composite resin, wherein the composite resin contains the polyethylene resin by 5 to 20 mass % and the polystyrene resin by 80 to 95 mass % (wherein a total of both thereof is 100 mass %), the blowing agent is an organic physical blowing agent, and a swelling degree, in methyl ethyl ketone at a temperature of 23° C., of a mixed insoluble matter of a xylene insoluble matter obtained through Soxhlet extraction of the expandable composite resin beads using xylene and an acetone insoluble matter contained in a xylene solution after the Soxhlet extraction, is not lower than 1.25.

Effects of the Invention

As described above, the expandable composite resin bead comprises: a composite resin of a polyethylene resin and a polystyrene resin such that the proportion of the polystyrene resin is higher as described above; and an organic physical blowing agent impregnating the composite resin. Thus, by using the expandable composite resin bead, the expanded composite resin bead and a foamed resin molded article, each of which having excellent rigidity, can be obtained by utilizing the excellent properties of the polystyrene resin. In addition, the swelling degree in the expandable composite resin bead is equal to or higher than the above described predetermined value. Thus, the expanded composite resin bead and the foamed resin molded article obtained by using the expandable composite resin bead can express excellent restorability while having excellent rigidity originating from the properties of the polystyrene resin.

DESCRIPTION OF THE PREFERRED EMBODIMENTS

Figure 1:
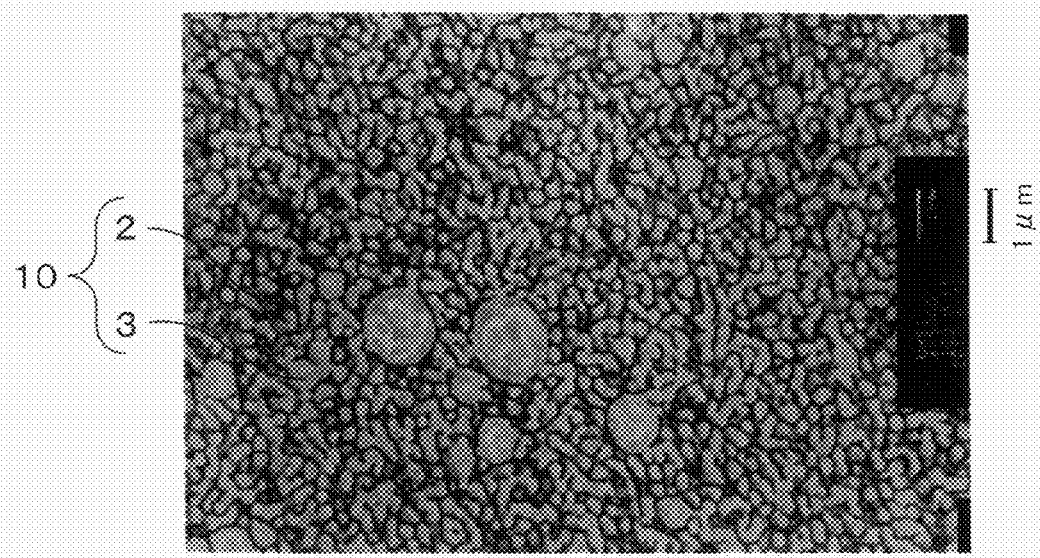
FIG. 1 shows a transmission electron microscope picture of a cross section of a central part of an expandable composite resin bead in Example 1.

Next, preferable embodiments of the expandable composite resin bead will be described.

The composite resin can be obtained by impregnating polyethylene resin nuclear bead with a styrene monomer, and polymerizing the styrene monomer in the nuclear bead. Furthermore, one part of a polystyrene resin may be included in the polyethylene resin nuclear bead in advance as a dispersion diameter enlarging agent as described later. Since crosslinking of the polyethylene resin included in the nuclear bead occurs during the polymerization process of the styrene monomer, "polymerization" sometimes includes "crosslinking" in the present specification.

The expandable composite resin bead includes a composite resin containing the polyethylene resin and the polystyrene resin at the predetermined proportions. The mass ratio of the polyethylene resin and the polystyrene resin in the composite resin can be obtained from the mass ratio of materials used when producing beads comprising the composite resin. Furthermore, the expandable composite resin bead comprises the composite resin and a blowing agent (foaming agent) impregnating the composite resin. The expanded composite resin bead can be produced by expanding (foaming and expanding) the expandable composite resin bead by applying heat etc. In addition, a foamed resin molded article (molded article formed from expanded composite resin beads) can be produced by molding the expanded composite resin beads in a mold (in-mold molding).

Generally, in an expanded bead including a composite resin of a polyethylene resin and a polystyrene resin, and in a molded article of the expanded beads; when the mass ratio of the polystyrene resin is increased, rigidity improves but restorability upon compression deteriorates. On the other hand, the expandable composite resin bead of the present application comprises a composite resin having a specific swelling degree. Thus, with expanded bead obtained using the expandable composite resin bead and with a molded article of the expanded beads, restorability upon compression can be largely improved while maintaining rigidity obtained through an increase in the mass ratio of the polystyrene resin.

When the proportion of the polyethylene resin with respect to the total amount of the polyethylene resin and the polystyrene resin in the composite resin is too small, the expanded composite resin bead and the foamed resin molded article obtained by using the expandable composite resin bead may not exhibit sufficient restorability. Thus, the composite resin preferably contains the polyethylene resin by not less than 5 mass % as described above, more preferably by not less than 10 mass %, and further preferably by not less than 12 mass %. From the same standpoint, the composite resin preferably contains the polystyrene resin by not more than 95 mass % as described above, more preferably by not more than 90 mass %, and further preferably by not more than 88 mass %. On the other hand, when the proportion of the polyethylene resin in the composite resin is too large, the expanded composite resin bead and the foamed resin molded article obtained by using the expandable composite resin bead may not exhibit sufficient rigidity. Thus, the composite resin preferably contains the polyethylene resin by not more than 20 mass % as described above, more preferably by not more than 19 mass %, further preferably by not more than 17 mass %, and even further preferably by not more than 15 mass %. From the same standpoint, the composite resin preferably contains the polystyrene resin by not less than 80 mass % as described above, more preferably by not less than 81 mass %, further preferably by not less than 83 mass %, and even further preferably by not less than 85 mass %.

The proportions of the polyethylene resin and the polystyrene resin described above in the composite resin can be determined from all combinations of the preferable ranges, the more preferable ranges, the further preferable ranges, and the even further preferable ranges of the upper limits and the lower limits described above.

Furthermore, the expandable composite resin bead includes the composite resin containing the polystyrene resin at a high ratio as described above. Thus, the expandable composite resin bead shows excellent retainability of organic physical blowing agents such as butane. Thus, the expandable composite resin bead enables simplification of storage temperature conditions, and extension of a storable period. As a result, the expandable composite resin bead can be stored, for example, at an ordinary temperature for an extended period of time while sufficiently retaining expanding power in a state of being placed in a sealed container. Thus, the expandable composite resin bead does not have to be expanded within a short period of time after the expandable composite resin bead is produced, and transportation and storage become possible as expandable composite resin bead in a non-bulky state.

In addition, when the expandable composite resin bead is stored actually for a long period of time and then expanded to obtain the expanded composite resin bead, variation of the apparent density of the expanded composite resin bead can be reduced. Furthermore, since the expanded composite resin bead has fine in-mold moldability, the foamed resin molded article obtained through in-mold molding of the expanded composite resin beads has excellent exterior view and fusion-bonding property between the expanded beads.

When a swelling degree, in methyl ethyl ketone at a temperature of 23° C. (hereinafter, simply referred to as "swelling degree"), of a mixed insoluble matter of a xylene insoluble matter obtained through Soxhlet extraction of the expandable composite resin bead using xylene and an acetone insoluble matter contained in a xylene solution after the Soxhlet extraction, is too low; the expanded composite resin bead and the foamed resin molded article obtained by using the expandable composite resin bead may not exhibit sufficient restorability. Thus, the swelling degree of the expandable composite resin bead is preferably not lower than 1.25 as described above, more preferably not lower than 1.50, and further preferably not lower than 2.00. In addition, from a standpoint of suppressing shrinkage of the expanded composite resin bead and the foamed resin molded article, the swelling degree of the expandable composite resin bead is preferably not higher than 10.00, and more preferably not higher than 5.00. The range of the swelling degree can be determined from all combinations of the preferable ranges, the more preferable ranges, and the further preferable ranges of the upper limits and the lower limits described above. Furthermore, the swelling degrees of the expanded composite resin bead and the foamed resin molded article obtained by using the expandable composite resin bead are also preferably within the same ranges as those of the expandable composite resin bead.

The reason for why excellent rigidity and restorability are obtained as described above when the swelling degree is not lower than the above described predetermined values is speculated on as follows.

The swelling degree (degree of swelling) of a crosslinked polyethylene resin when being immersed in an organic solvent correlates with a crosslinked structure (three-dimensional network structure) of the resin, and since the absorbed amount of the organic solvent becomes lower when the network is finer, the swelling degree becomes low. On the other hand, an uncrosslinked polyethylene resin also hardly swells in methyl ethyl ketone at a temperature of 23° C.

More specifically, for a mixed insoluble matter of a xylene insoluble matter (crosslinked polyethylene resin components) of the composite resin forming the expandable composite resin bead as described above and an acetone insoluble matter (a total of crosslinked polyethylene resin components that have passed through a mesh, uncrosslinked polyethylene resin components, and polyethylene resin components to which a styrene monomer has been graft-polymerized) in the xylene soluble matter; having a high swelling degree means a polyethylene resin component with a coarse network in a crosslinked three-dimensional network structure is contained in a large amount in the polyethylene resin included in the composite resin, when compared to having a low swelling degree.

Thus, since the polyethylene resin component with the coarse network in the crosslinked three-dimensional network structure is easily extended adequately while maintaining strength during expanding of the expandable composite resin bead, a foam cell wall having large strength is speculated to be formed. Furthermore, since the polyethylene resin in the composite resin is flexible and can sufficiently deform when the expanded composite resin bead is compressed, it is speculated that the foam cell wall of the expanded beads can maintain a closed-cell structure without being ruptured even when the ratio of the polystyrene resin is high in the composite resin. Thus, by using the expandable composite resin bead whose swelling degree is in a specific range, the expanded composite resin bead and the foamed resin molded article having high levels of both rigidity and restorability can be obtained.

With production conditions that have been conventionally investigated (e.g., a condition in which ratio by mass of the polyethylene resin nuclear bead and a first monomer (styrene monomer) is large, a condition in which a temperature at which the polyethylene resin nuclear bead is impregnated with the first monomer (styrene monomer) is high, and a condition in which a polymerization initiator having a high hydrogen drawing ability is used); the rate at which the styrene monomer polymerizes in the polyethylene resin to be deposited as the polystyrene resin at the beginning of polymerization becomes fast, and the network in the crosslinked three-dimensional network structure of the polyethylene resin is speculated to become fine. On the other hand, when producing the above expandable composite resin bead, by adjusting the type and added amount of a polymerization initiator, the polymerization temperature, and the ratio by mass of the polyethylene resin nuclear bead and the first monomer (styrene monomer); it is possible to reduce the rate at which the polystyrene resin component is deposited at the beginning of polymerization, and control the amount of the polyethylene resin component having a fine network in the crosslinked three-dimensional network structure to be small.

In addition, in the expandable composite resin bead, the weight ratio of the xylene insoluble matter obtained through the Soxhlet extraction is preferably not higher than 40% (including 0). In this case, expandability (foamability) of the expandable composite resin bead can be further improved. Furthermore, the weight ratio of the xylene insoluble matter in the expandable composite resin bead is more preferably 5 to 35%, and further preferably 10 to 30%. In this case, the rigidity and the restorability of the expanded composite resin bead and the foamed resin molded article obtained using the expandable composite resin bead can be further improved.

Furthermore, from a standpoint of further improving the rigidity and the restorability, the weight ratio of the xylene insoluble matter in the expanded composite resin bead and the foamed resin molded article is also preferably not higher than 40% (including 0), more preferably 5 to 35%, and further preferably 10 to 30%.

The morphologies of the composite resin in the expandable composite resin bead include a morphology (sea-sea structure) in which the polyethylene resin and the polystyrene resin form a co-continuous phase, a morphology (island-sea structure) in which the polyethylene resin forms a dispersed phase (island phase) and the polystyrene resin forms a continuous phase (sea phase), or a morphology (sea-island structure) in which the polyethylene resin forms a continuous phase and the polystyrene resin forms a dispersed phase. Among the morphologies described above, the morphology (sea-island structure) in which the polyethylene resin forms a continuous phase and the polystyrene resin forms a dispersed phase, or the morphology (sea-sea structure) in which the polyethylene resin and the polystyrene resin form a co-continuous phase is preferable. In this case, a further excellent restorability can be obtained when compared to the morphology (island-sea structure) in which the polystyrene resin forms a continuous phase and the polyethylene resin forms a dispersed phase.

The morphology of the expandable composite resin bead can be observed with the following technique.

Specifically, first, a sample for observation is cut out from a central part of the expandable composite resin bead. Next, the sample for observation is embedded in an epoxy resin, stained using ruthenium tetraoxide, and then an ultra-thin section is prepared from the sample using an ultramicrotome. The ultra-thin section is placed on a grid, the morphology of the cross section of the central part of the expandable composite resin bead is observed by a transmission electron microscope (JEM1010 manufactured by JEOL Ltd.) at a 10000-fold magnification, and a cross-sectional picture (TEM picture) is captured. From the cross-sectional picture, the morphology of the phase of the polyethylene resin and the phase of the polystyrene resin in the expandable composite resin bead is visually observed.

It should be noted that, when the composite resin exhibits the morphology with the above described configuration at the central part of the expandable composite resin bead, it has been confirmed that an expanded composite resin bead and a foamed resin molded article having further excellent restorability can be obtained. In this case, it is thought that a similar morphology is exhibited not only at the central part of the expandable composite resin bead but also approximately at the whole except for a surface part.

From the transmission electron microscope picture of the cross section of the central part of the expandable composite resin bead, an interface ratio ($\mu m/\mu m^2$) of the polyethylene resin and the polystyrene resin can be calculated by dividing the sum total of the length ($\mu m$) of an interface between the polyethylene resin and the polystyrene resin by the area ($\mu m^2$) of the region where the interface has been observed. In order to obtain further excellent restorability, the interface ratio at the cross section of the expandable composite resin bead is preferably larger than 6 $\mu m/\mu m^2$. On the other hand, when the interface ratio is too large, dissipation of the blowing agent occurs easily, and the expandability may deteriorate. Thus, the interface ratio is preferably not larger than 50 $\mu m/\mu m^2$.

As the polyethylene resin, for example, a branched low density polyethylene, a linear low density polyethylene, a high density polyethylene, an ethylene-acrylic acid copolymer, an ethylene-acrylic acid alkyl ester copolymer, an ethylene-methacrylic acid alkyl ester copolymer, and the like can be used. Furthermore, as the polyethylene resin, a single type of a polymer may be used, or a mixture of two or more types of polymers may be used.

Preferably, the linear low density polyethylene is the main component of the polyethylene resin. Preferably, the linear low density polyethylene has a branched structure having a linear polyethylene chain and a short branched chain with a carbon number of 2 to 6. Specific examples thereof include ethylene-hexene copolymers, ethylene-octene copolymers, and the like.

In particular, the polyethylene resin is preferably a linear low density polyethylene polymerized using a metallocene polymerization catalyst. In this case, a foamed resin molded article that is excellent particularly in post-compression restorability can be obtained.

Furthermore, the melting point Tm of the polyethylene resin is preferably 95 to 115° C. In this case, the polyethylene resin can be sufficiently impregnated with the styrene monomer when producing the expandable composite resin bead, and a suspension system can be prevented from being destabilized upon polymerization. As a result, when the obtained expandable composite resin bead is used, it is possible to obtain a foamed resin molded article having both, at higher levels, the excellent rigidity of the polystyrene resin and the excellent restorability of the polyethylene resin. More preferably, the melting point Tm of the polyethylene resin is 100 to 110° C. It should be noted that the melting point Tm of the polyethylene resin can be measured using differential scanning calorimetry (DSC) based on JIS K7121 (1987).

Furthermore, the polyethylene resin preferably includes a linear low density polyethylene satisfying a relationship of $Tm-Tv \leq 20$(° C.) regarding the melting point Tm (° C.) and the Vicat softening temperature Tv (° C.). Such a polyethylene resin exhibits a uniform molecular structure, and the network structure through crosslinking is speculated to be distributed more uniformly in the polyethylene resin. Thus, in this case, the strength and restorability can be further improved for the foamed resin molded article obtained through expanding and molding the expandable composite resin bead. From the same standpoint, the linear low density polyethylene more preferably satisfies $Tm-Tv \leq 15$(° C.), and further preferably satisfies $Tm-Tv \leq 10$(° C.). It should be noted that the Vicat softening temperature Tv of the polyethylene resin can be measured based on JIS K 7206 (1999).

From a standpoint of expandability, a melt mass flow rate (MFR, 190° C., 2.16 kgf) of the polyethylene resin is preferably 0.5 to 4.0 g/10 min, and more preferably 1.0 to 3.0 g/10 min. The MFR (190° C., 2.16 kgf) of the polyethylene resin is a value measured from condition code D based on JIS K7210 (1999). As a measuring device, a melt indexer (e.g., type L203 manufactured by Takara Kogyou Co., Ltd.) can be used.

Furthermore, a degree of crystallinity of the polyethylene resin is preferably 20 to 35%. In this case, the expandability and the retainability of the blowing agent can be further improved. More specifically, when the degree of crystallinity of the polyethylene resin is within the above described range, gas molecules (blowing agent) are thought to have difficulty pressing and expanding the polymer chain of the polyethylene resin. As a result, transmission of the blowing agent becomes low, and the retainability of the blowing agent can be speculated to be high as described above. From the same standpoint, the degree of crystallinity of the polyethylene resin is preferably 20 to 30%. The degree of crystallinity of the polyethylene resin is obtained from a melting calorie measured using differential scanning calorimetry (DSC) based on JIS K7122 (1987).

Furthermore, the polystyrene resin refers to those having styrene component units by not less than 50 mass %. The styrene component units in the polystyrene resin are preferably not less than 80 mass %, and more preferably not less than 90 mass %. In the present specification, the styrene forming the polystyrene resin, and a monomer copolymerizable with styrene added if necessary are sometimes also referred together to as a styrene monomer.

Examples of the monomer copolymerizable with styrene include the following styrene derivatives and other vinyl monomers etc.

Examples of the styrene derivative include α-methylstyrene, o-methylstyrene, m-methylstyrene, p-methylstyrene, p-ethylstyrene, 2,4-dimethylstyrene, p-methoxystyrene, p-n-butylstyrene, p-t-butylstyrene, o-chlorostyrene, m-chlorostyrene, p-chlorostyrene, 2,4,6-tribromostyrene, divinylbenzene, styrenesulfonic acid, sodium styrenesulfonate, and the like. These may be used singly or as a mixture of two or more types.

Furthermore, examples of other vinyl monomers include acrylic esters, methacrylic esters, vinyl compounds containing a hydroxyl group, vinyl compounds containing a nitrile group, organic-acid vinyl compounds, olefin compounds, diene compounds, vinyl halide compounds, vinylidene halide compounds, maleimide compounds, and the like.

Examples of the acrylic esters include methyl acrylate, ethyl acrylate, propyl acrylate, butyl acrylate, 2-ethylhexyl acrylate, and the like.

Examples of the methacrylic esters include methyl methacrylate, ethyl methacrylate, propyl methacrylate, butyl methacrylate, 2-ethylhexly methacrylate, and the like. Examples of the vinyl compounds containing a hydroxyl group include hydroxyethyl acrylate, hydroxypropyl acrylate, hydroxyethyl methacrylate, hydroxypropyl methacrylate, and the like.

Examples of the vinyl compounds containing a nitrile group include acrylonitrile, methacrylonitrile, and the like.

Examples of the organic-acid vinyl compounds include vinyl acetate, vinyl propionate, and the like.

Examples of the olefin compounds include ethylene, propylene, 1-butene, 2-butene, and the like.

Examples of the diene compounds include butadiene, isoprene, chloroprene, and the like.

Examples of the vinyl halide compounds include vinyl chloride, vinyl bromide, and the like.

Examples of the vinylidene halide compounds include vinylidene chloride and the like.

Examples of the maleimide compounds include N-phenylmaleimide, N-methylmaleimide, and the like.

These vinyl monomers may be used singly or as a mixture of two or more types.

As the polystyrene resin, from a standpoint of increasing expandability; polystyrene, and a copolymer of styrene and an acrylic monomer are preferable. In addition, when producing the expandable composite resin bead, from a standpoint of expandability thereof; styrene and butyl acrylate are preferably used as monomers forming the polystyrene resin as shown in Examples described later. In this case, the contained amount of the butyl acrylate in the composite resin with respect to the whole composite resin is preferably 0.5 to 10 mass %, more preferably 1 to 8 mass %, and further preferably 2 to 5 mass %.

The weight average molecular weight of the polystyrene resin is preferably 100,000 to 600,000.

In this case, when expanding the expandable composite resin bead, shrinkage of the expanded bead can be prevented. Furthermore, fusion-bonding property between the expanded composite resin beads can be improved when in-mold molding the expanded composite resin beads obtained after the expanding. As a result, dimensional stability of the foamed resin molded article can be improved. From the same standpoint, the weight average molecular weight of the polystyrene resin is not smaller than 300,000, more preferably not smaller than 350,000, and further preferably not smaller than 400,000. Furthermore the weight average molecular weight of the polystyrene resin is preferably not larger than 550,000. The range of the weight average molecular weight of the polystyrene resin can be determined from all combinations of the preferable ranges, the more preferable ranges, and the further preferable ranges of the upper limits and the lower limits described above. A method for measuring the weight average molecular weight of the polystyrene resin will be described later in the Examples.

The glass transition temperature (Tg) of the polystyrene resin is preferably 85 to 100° C. In this case, expandability of the expandable composite resin bead can be improved, and shrinkage upon expanding can be prevented. Furthermore, fusion-bonding property between the expanded composite resin beads can be improved when in-mold molding the expanded composite resin beads obtained after the expanding, and dimensional stability of the foamed resin molded article can be improved.

For example, the glass transition temperature (Tg) of the polystyrene resin can be measured as described next.

Specifically, first, 1.0 g of the expandable composite resin beads is placed in a 150-mesh wire net bag. Next, approximately 200 ml of xylene is poured in a 200-ml round shape flask, and the sample placed in the wire net bag is set in a Soxhlet extraction tube. The sample is heated for 8 hours using a mantle heater to perform the Soxhlet extraction. The extracted xylene solution is poured into 600 ml of acetone, decantation is performed thereon, and a supernatant solution thereof is placed under reduced pressure to be evaporated to dryness to obtain a polystyrene resin as an acetone soluble matter. On 2 to 4 mg of the obtained polystyrene resin, thermal flux differential scanning calorimetry is performed using DSC measuring instrument (Q1000) manufactured by TA Instruments Co., Ltd., in conformance to JIS K7121 (1987). Then, the glass transition temperature Tg can be obtained as a midpoint glass transition temperature of a DSC curve obtained with a heating rate condition of 10° C/min.

The expandable composite resin bead contains an organic physical blowing agent as the blowing agent. As the organic physical blowing agent, for example, saturated hydrocarbon compounds having a carbon number of 3 to 6, lower alcohols having a carbon number not higher than 5, ether compounds, and the like can be used. Specifically, examples of the saturated hydrocarbon compounds that can be used include propane, n-butane, isobutane, cyclobutane, n-pentane, isopentane, neopentane, cyclopentane, n-hexane, cyclohexane, and the like. Examples of the lower alcohols that can be used include methanol, ethanol, and the like. Examples of the ether compounds that can be used include dimethyl ether, diethyl ether, and the like. These blowing agents can be used singly or as a mixture of two or more types. As the ether compounds, for example, those having a carbon number not higher than 6 can be used.

Preferably, as the organic physical blowing agent, a saturated hydrocarbon compound having a carbon number of 3 to 6 is used, and more preferably, a mixture of 30 to 80 mass % of isobutane and 20 to 70 mass % of another hydrocarbon having a carbon number of 4 to 6 is used. However, the total amount of the isobutane and the other hydrocarbon having a carbon number of 4 to 6 is 100 mass %. By adjusting the proportions of the isobutane and the other hydrocarbon having a carbon number of 4 to 6 as described above, the expandable composite resin bead can be sufficiently impregnated with and sufficiently hold the organic physical blowing agent. In addition, when molding the expanded composite resin bead obtained by expanding the expandable composite resin bead, the expanding power thereof can be improved. Furthermore, fusion-bonding property between the expanded beads can be further improved in the foamed resin molded article obtained through in-mold molding of the expanded composite resin bead. The proportion of isobutane in the organic physical blowing agent is preferably not less than 40 mass % but not more than 75 mass %.

In addition, the contained amount of the blowing agent in the expandable composite resin bead is preferably to 10 mass %. In this case, expandability of the expandable composite resin bead can be further improved, and shrinkage upon expanding can be prevented. Furthermore, fusion-bonding property between the expanded composite resin beads can be further improved when in-mold molding the expanded composite resin bead obtained after the expanding. As a result, dimensional stability of the obtained foamed resin molded article can be improved. More preferably, the contained amount of the blowing agent is not less than 4 mass % but not more than 9 mass %.

Next, a method for producing the expandable composite resin bead will be described.

First, nuclear beads whose main component is the polyethylene resin are suspended in an aqueous medium to prepare a suspension. Next, the styrene monomer is added to the suspension. The nuclear beads are impregnated with the styrene monomer, and the styrene monomer is polymerized, and then the beads are impregnated with the blowing agent to produce the expandable composite resin beads.

When impregnating the nuclear beads with the styrene monomer and polymerizing those, although the entire usage amount of the styrene monomer may be added collectively, the usage amount of the styrene monomer may be, for example, divided into a first monomer and a second monomer, and these monomers may be added at different timings as in a later described dispersion step and modification step. By adding the styrene monomer in a divided manner as in the latter case, coagulation among the resin beads during polymerization can be suppressed.

The expandable composite resin beads can be produced by performing, for example, the following dispersion step, modification step, and impregnation step. At the dispersion step, in a suspension obtained by suspending nuclear beads whose main component is the polyethylene resin in an aqueous medium, the first monomer (styrene monomer) and a polymerization initiator are added to disperse the first monomer in the suspension.

At the modification step, the suspension is heated, the second monomer (styrene monomer) is continuously added to the suspension over the course of a predetermined adding time at a temperature of (Tm−10) to (Tm+30)° C., when Tm is the melting point of the polyethylene resin in the nuclear beads, to impregnate the nuclear beads with the styrene monomer and polymerize those.

It should be noted that when a seed ratio (weight ratio of the first monomer with respect to the nuclear beads) of the styrene monomer (first monomer) is too low, the expandable composite resin beads become flat and filling performance thereof upon molding may deteriorate. Thus, the seed ratio of the first monomer is preferably not lower than 0.5, more preferably not lower than 0.7, and further preferably not lower than 0.8. On the other hand, when the seed ratio is too high, the styrene monomer becomes polymerized before sufficiently impregnating the nuclear beads. As a result, a molded article having fine restorability may not be obtained, and a stable state after the suspending may become difficult to obtain and the resin may form a block object. Thus, the seed ratio of the first monomer is preferably not higher than 1.5, more preferably not higher than 1.3, and further preferably not higher than 1.2. The range of the seed ratio of the first monomer can be determined from all combinations of the preferable ranges, the more preferable ranges, and the further preferable ranges of the upper limits and the lower limits described above.

At the impregnation step, at a temperature in a range from Tg−10 to Tg+40 (° C.) (wherein Tg is a glass transition temperature (° C.) of the obtained polystyrene resin), the resin beads are impregnated with the physical blowing agent during and/or after the polymerization to obtain the expandable composite resin beads.

By performing the dispersion step, the modification step, and the impregnation step, the expandable composite resin beads having excellent expandability and blowing agent retainability can be obtained. Furthermore, the foamed resin molded article obtained by expanding and molding the expandable composite resin beads have excellent rigidity and restorability.

In the following, each of the steps in the method for producing the expandable composite resin beads will be described in further detail.

At the dispersion step, the suspension can be prepared by suspending the nuclear beads in an aqueous medium containing, for example, a suspending agent, a surfactant, a water-soluble polymerization inhibitor, and the like. In addition, in the dispersion step, the first monomer and the polymerization initiator are added to the suspension.

The nuclear beads may contain an additive such as a cell controlling agent, a pigment, a slipping agent, an antistatic agent, and a flame retardant. The nuclear beads can be produced by blending the polyethylene resin and a dispersion diameter enlarging agent (thermoplastic resin) that is added if necessary; and melt-kneading and finely granulating the blended material. The melt-kneading can be performed by an extruder. For this moment, in order to perform the kneading uniformly, an extrusion is preferably performed after each resin component is mixed in advance. The mixing of each of the resin components can be performed by a mixing machine such as, for example, a Henschel mixer, a ribbon blender, a V blender, and a Lödige mixer. By using the dispersion diameter enlarging agent, the size of the polystyrene resin phase can be adjusted, and the morphology of the polyethylene resin and the polystyrene resin can be controlled. As a result, the retainability of the blowing agent and expandability/moldability can be improved, and a foamed resin molded article having excellent strength while maintaining toughness, which is a characteristic of the polyethylene resin, can be attained. In order to uniformly disperse the dispersion diameter enlarging agent, the melt-kneading are preferably performed using, for example, a twin-screw extruder or a high dispersion type screw such as Dulmage type, Maddock type, and Unimelt type screws.

As the dispersion diameter enlarging agent, for example, at least one type selected from polystyrene, an acrylonitrile-styrene copolymer, a rubber modified polystyrene, an ABS resin, and an AES resin can be used. The acrylonitrile-styrene copolymer is preferable. Furthermore, the amount of acrylonitrile component in the acrylonitrile-styrene copolymer is preferably 20 to 40 mass %.

When the dispersion diameter enlarging agent is used, the dispersion diameter enlarging agent becomes dispersed in the polyethylene resin of the nuclear beads. At this moment, the average diameter (dispersion diameter) of the phase formed from the dispersion diameter enlarging agent dispersed in the polyethylene resin is preferably 10 to 1000 nm, and more preferably 10 to 500 nm. The dispersion diameter is an average of a circle equivalent diameter of the phase formed from the dispersion diameter enlarging agent at a cross section of the nuclear beads.

In addition, a melt mass flow rate (MFR (200° C., 5 kgf)) of the dispersion diameter enlarging agent is preferably 1 g/10 min to 20 g/10 min, and more preferably 2.5 g/10 min to 15 g/10 min. The MFR (200° C., kgf) of the dispersion diameter enlarging agent is a value measured from condition code H based on JIS K7210 (1999). As a measuring device, a melt indexer (e.g., type L203 manufactured by Takara Kogyou Co., Ltd.) can be used.

The contained amount of the dispersion diameter enlarging agent in the nuclear beads with respect to 100 parts by mass of the polyethylene resin forming the nuclear beads is preferably 1 to 10 parts by mass, and more preferably 3 to 7 parts by mass. When the contained amount of the dispersion diameter enlarging agent is within the above described range, the morphology (sea-sea structure) in which the polyethylene resin and the polystyrene resin show a co-continuous phase can be formed easily. Furthermore, in the above described range, in the morphology (sea-island structure) in which the polyethylene resin forms a continuous phase and the polystyrene resin forms a dispersed phase, a dispersion diameter of the polystyrene resin (dispersed phase) can be enlarged easily. As a result, the blowing agent retainability of the expandable composite resin beads can be sufficiently improved. In addition, from a standpoint of maintaining fine restorability and rigidity of the foamed resin molded article obtained through expanding and in-mold molding the expandable composite resin beads, the contained amount of the dispersion diameter enlarging agent is preferably set in the above described range.

To the nuclear beads, a cell controlling agent for adjusting the foam cell size of the expanded composite resin beads after the expanding can be added.

As the cell controlling agent, for example, organic substances such as bisamides of higher fatty acids and metal salts of higher fatty acids can be used. Furthermore, inorganic substances known in the art can also be used as the cell controlling agent. When an organic substance is used as the cell controlling agent, the blend amount with respect to 100 parts by mass of the resin for the nuclear beads is preferably within a range of 0.01 to 2 parts by mass. Furthermore, when an inorganic substance is used as the cell controlling agent, the blend amount with respect to 100 parts by mass of the resin for the nuclear beads is preferably within a range of 0.1 to 5 parts by mass.

Granulation of the nuclear beads can be performed by cutting the blended materials that have been melt-kneaded with an extruder using a strand cutting method, a hot cutting method, an underwater cutting method, or the like. Other methods can also be used as long as a desired particle diameter is obtained with the method.

When the particle diameter of the nuclear beads is too small, retainability of the blowing agent may deteriorate. Thus, the particle diameter of the nuclear beads is preferably not smaller than 0.1 mm, and more preferably not smaller than 0.3 mm. On the other hand, when the particle diameter is too large, the particle diameter of the expanded beads after expanding also increases, and filling performance to a metal mold during in-mold molding may deteriorate. Thus, the particle diameter of the nuclear beads is preferably not larger than 3.0 mm, and more preferably not larger than 1.5 mm. The range of the particle diameter of the nuclear beads can be determined from all combinations of the preferable ranges and the more preferable ranges of the upper limits and the lower limits described above.

When an extruder is to be used, for example, a resin can be extruded from holes with a bore diameter within a range of the desired particle diameter, and the particle diameter can be adjusted in the desired range by changing the cutting speed to cut the resin.

The particle diameter of the nuclear beads can be measured as described next, for example.

More specifically, the nuclear beads are observed in a microscope picture, the maximum diameter of the nuclear bead is measured in each of 200 or more of the nuclear beads, and an arithmetic average value of the measured maximum diameters is used as a particle diameter of the nuclear beads.

The nuclear beads are ordinarily suspended in an aqueous medium to obtain a suspension. The dispersion into the aqueous medium can be performed by using, for example, a sealed container having a stirrer. Examples of the aqueous medium include deionized water etc.

The nuclear beads are preferably dispersed in the aqueous medium together with a suspending agent.

Examples of the suspending agent that can be used include fine-particle inorganic suspending agents such as tricalcium phosphate, hydroxyapatite, magnesium pyrophosphate, magnesium phosphate, aluminium hydroxide, ferric hydroxide, titanium hydroxide, magnesium hydroxide, barium phosphate, calcium carbonate, magnesium carbonate, barium carbonate, calcium sulfate, barium sulfate, talc, kaolin, and bentonite. In addition, for example, organic suspending agents such as polyvinyl pyrrolidone, polyvinyl alcohol, ethyl cellulose, and hydroxypropyl methylcellulose can also be used. Tricalcium phosphate, hydroxyapatite, and magnesium pyrophosphate are preferable. These suspending agents can be used singly or in a combination of two or more.

The usage amount of the suspending agent with respect to 100 parts by mass of the aqueous medium in the suspension-polymerization system (all the water in the system including water of a slurry containing a reaction product) is, in solid content amount, preferably 0.05 to 10 parts by mass and more preferably 0.3 to 5 parts by mass. When the amount of the suspending agent deviates from the above described range and is too small, it becomes difficult to suspend and stabilize the styrene monomer, and the aggregates of the resin may be produced. On the other hand, when the amount of the suspending agent deviates from the above described range and is too large, not only the production cost increases but also the particle size distribution may become broad.

Furthermore, a surfactant can be added to the suspension. As the surfactant, for example, anionic surfactants, nonionic surfactants, cationic surfactants, and amphoteric surfactants can be used.

Examples of the anionic surfactants that can be used include sodium alkylsulfonate, sodium alkylbenzene sulfonate, sodium lauryl sulfate, sodium α-olefin sulfonate, sodium dodecyl phenyl ether disulfonate, and the like.

Examples of the nonionic surfactants that can be used include polyoxyethylene dodecyl ether, polyoxyethylene nonylphenyl ether, polyoxyethylene lauryl ether, and the like.

As the cationic surfactants, alkylamine salts such as coconut amine acetate and stearylamine acetate can be used. In addition, quaternary ammoniums such as lauryl trimethyl ammonium chloride and stearyl trimethyl ammonium chloride can also be used.

As the amphoteric surfactants, alkyl betaines such as lauryl betaine and stearyl betaine can be used. In addition, alkylamine oxides such as lauryl dimethylamine oxide can also be used.

These surfactants may be used singly or in combination of two or more.

Preferably, an anionic surfactant is used as a surfactant. More preferably, an alkali metal salt (preferably, a sodium salt) of alkylsulfonate having a carbon number of 8 to 20 is used. With this, the suspension can be stabilized sufficiently.

Furthermore, to the suspension, electrolytes including inorganic salts such as, for example, lithium chloride, potassium chloride, sodium chloride, sodium sulfate, sodium nitrate, sodium carbonate, and sodium bicarbonate can be added if necessary.

In order to obtain a foamed resin molded article having excellent toughness and mechanical strength, a water-soluble polymerization inhibitor is preferably added to the suspension.

Examples of the water-soluble polymerization inhibitor that can be used include sodium nitrite, potassium nitrite, ammonium nitrite, L-ascorbic acid, citric acid, and the like.

The water-soluble polymerization inhibitor hardly impregnates the nuclear beads and dissolves in the aqueous medium. Thus, although the styrene monomer impregnated into the nuclear beads is polymerized, polymerization is suppressed for minute droplets of the styrene monomer in the aqueous medium which is not impregnated into the nuclear beads, and for the styrene monomer that is located around the surface of the nuclear beads and is in the process of being impregnated into the nuclear beads. As a result, the amount of the polystyrene resin on the surface of the expandable composite resin beads can be controlled to be less, and the retainability of the blowing agent is speculated to be further improved.

The added amount of the water-soluble polymerization inhibitor with respect to 100 parts by mass of the aqueous medium (referring to all the water in the system including water of the slurry containing the reaction product) is preferably 0.001 to 0.1 parts by mass and more preferably 0.005 to 0.06 parts by mass.

In order to uniformly polymerize the styrene monomer in the nuclear beads, the styrene monomer is caused to impregnate the nuclear beads and be polymerized. In this case, crosslinking of the polyethylene resin may occur together with the polymerization of the styrene monomer. Although the polymerization initiator is used for the polymerization of the styrene monomer, a crosslinking agent can be used in combination if necessary. When the polymerization initiator and/or the crosslinking agent are/is used, the polymerization initiator and/or the crosslinking agent are/is preferably dissolved in the styrene monomer in advance.

As the polymerization initiator, there can be used a polymerization initiator which is used in the suspension polymerization method for a styrene monomer, for example, a polymerization initiator that is soluble in a vinyl monomer and whose 10-hour half-life temperature is 50 to 120° C. Specific examples thereof that can be used include organic peroxides such as cumene hydroxy peroxide, di-cumyl peroxide, t-butylperoxy-2-ethylhexanoate, t-butyl peroxybenzoate, benzoyl peroxide, t-butyl peroxyisopropylcarbonate, t-amyl peroxy-2-ethylhexyl carbonate, hexylperoxy-2-ethylhexyl carbonate, and lauroyl peroxide. Furthermore, as the polymerization initiator, azo compounds such as azobis isobutyronitrile can also be used. These polymerization initiators can be used singly or in combination of two or more. Furthermore, from a standpoint of easily adjusting the swelling degree of the composite resin described above and easily reducing residual monomers, t-butylperoxy-2-ethylhexanoate is preferable as the polymerization initiator.

The polymerization initiator can also be dissolved in a solvent and added to impregnate the nuclear beads.

As the solvent for dissolving the polymerization initiator, aromatic hydrocarbons, aliphatic hydrocarbons, and the like can be used. Examples of the aromatic hydrocarbons include ethylbenzene, toluene, and the like. Examples of the aliphatic hydrocarbons include heptane, octane, and the like. The polymerization initiator is preferably used within a range of 0.01 to 3 parts by mass with respect to 100 parts by mass of the styrene monomer.

As the crosslinking agent, there can be used a crosslinking agent which does not decompose at the polymerization temperature but decomposes at the crosslinking temperature and whose 10-hour half-life temperature is higher than the polymerization temperature by 5 to 50° C. Specific examples thereof that can be used include peroxides such as di-cumyl peroxide, 2,5-t-butyl peroxybenzoate, and 1,1-bis-t-butyl peroxycyclohexane. As the crosslinking agent, those described above may be used singly or in combination of two or more. The blend amount of the crosslinking agent with respect to 100 parts by mass of the styrene monomer is preferably 0.1 to 5 parts by mass.

It should be noted that the same compound can also be used as the polymerization initiator and the crosslinking agent.

A cell controlling agent can be added to the styrene monomer or the solvent.

Examples of the cell controlling agent that can be used include fatty acid monoamides, fatty acid bisamides, talc, silica, polyethylene wax, methylene bis stearic acid, methyl methacrylate copolymers, silicone, and the like. As the fatty acid monoamides, for example, oleamide, stearamide, and the like can be used. As the fatty acid bisamides, for example, ethylene bis stearamide and the like can be used. The cell controlling agent is preferably used by 0.01 to 2 parts by mass with respect to 100 parts by mass of the styrene monomer.

To the styrene monomer, a plasticizing agent, an oil-soluble polymerization inhibitor, a flame retardant, a dye, or the like can be added if necessary.

Examples of the plasticizing agent that can be used include fatty acid esters, acetylated monoglycerides, oil and fat, hydrocarbon compounds, and the like. Examples of the fatty acid esters that can be used include glycerin tristearate, glycerin trioctoate, glycerin trilaurate, sorbitan tri stearate, sorbitan mono stearate, butyl stearate, and the like. Examples of the acetylated monoglycerides that can be used include glycerin diaceto monolaurate and the like. Examples of the oil and fat that can be used include hardened beef tallow, hydrogenated castor oil, and the like. Examples of the hydrocarbon compounds that can be used include cyclohexane, liquid paraffin, and the like.

Examples of the oil-soluble polymerization inhibitor that can be used include para-t-butylcatechol, hydroquinone, benzoquinone, and the like.

Next, at the modification step, heating of the suspension after the dispersion step is initiated. When Tm is the melting point of the polyethylene resin in the nuclear beads, the second monomer (styrene monomer) is preferably added to the suspension continuously over the course of a predetermined adding time at a temperature of (Tm−10) to (Tm+30)° C. With this, the styrene monomer can be impregnated in each of the nuclear beads and be polymerized. When the temperature at which the second monomer is added departs from the temperature of (Tm−10) to (Tm+30)° C., the suspension system may be destabilized and the aggregates of the resin may be produced. The temperature at which the second monomer is added is more preferably from (Tm−5) to (Tm+10)° C.

The blending of the nuclear beads and the styrene monomer is preferably adjusted such that the mass ratio of the polyethylene resin and the polystyrene resin becomes 5:95 to 20:80 (polyethylene resin:polystyrene resin, the total of the two is 100). Furthermore, the mass ratio (polyethylene resin:polystyrene resin) is more preferably adjusted to 10:90 to 19:81, and further preferably adjusted to 12:88 to 17:83.

The polymerization temperature at the modification step is preferably 60 to 105° C., although the temperature is different depending on the type of the used polymerization initiator. The crosslinking temperature is preferably 100 to 150° C., although the temperature is different depending on the type of the used crosslinking agent.

Next, at the impregnation step, during and/or after the polymerization of the styrene monomer, the resin beads are impregnated with the blowing agent (physical blowing agent) to obtain the expandable composite resin beads. Thus, the impregnating with the blowing agent can be performed during or after the polymerization of the styrene monomer. Specifically, the blowing agent is pressure-injected in a container holding the resin beads during or after the polymerization to impregnate the resin beads.

When the impregnation temperature for the blowing agent is too low, the contained amount of the blowing agent at the beginning becomes large. This is not a problem when the expandable composite resin beads are immediately expanded, but when the expandable composite resin beads are expanded after being stored or transported in an atmosphere with a temperature equal to or higher than an ordinary temperature, the retainability of the blowing agent may deteriorate. In addition, plasticization becomes insufficient, stress may be generated when expanding the expandable composite resin beads, and the closed-cell rate in the foamed resin molded article obtained after the expanding and molding may decrease. This is estimated to be caused because, although the blowing agent impregnates the phase of the polyethylene resin that is easily impregnated with the blowing agent, the phase of the polystyrene resin is not sufficiently impregnated with the blowing agent and the blowing agent escapes from the phase of the polyethylene resin from which the blowing agent easily dissipates. On the other hand, when the impregnation temperature for the blowing agent is too high, the expandable composite resin beads may coagulate among themselves when being impregnated with the blowing agent. Thus, when the glass transition temperature of the polystyrene resin is defined as Tg (° C.), the impregnation temperature for the blowing agent is preferably within a range of Tg−10 to Tg+40(° C.), and more preferably within a range of Tg−5 to Tg+25(° C.).

After the impregnation with the blowing agent, the expandable composite resin beads can be dewatered and dried, and the surface of the expandable composite resin beads can be coated with a surface coating agent if necessary.

Examples of the surface coating agent include zinc stearate, stearic acid triglyceride, stearic acid monoglyceride, castor hydrogenated oil, and the like. In addition, an antistatic agent can also be used as a functional surface coating agent. The added amount of the surface coating agent with respect to 100 parts by mass of the expandable composite resin beads is preferably 0.01 to 2 parts by mass.

By heating and expanding the expandable composite resin beads with a heating medium, the expanded composite resin bead can be obtained. Specifically, the expandable composite resin beads can be foamed and expanded by introducing a heating medium such as steam into a preliminary expanding machine having the expandable composite resin beads provided therein. Furthermore, the expandable composite resin beads can also be foamed and expanded by discharging the expandable composite resin beads, which are dispersed in an aqueous medium within a sealed container, out from the sealed container together with the dispersion medium.

The expanded composite resin bead is formed from a composite resin containing a polyethylene resin and a polystyrene resin. The composite resin contains 5 to 20 mass % of the polyethylene resin and 80 to 95 mass % of the polystyrene resin (wherein a total of both thereof is 100 mass %). A swelling degree, in methyl ethyl ketone at a temperature of 23° C., of a mixed insoluble matter of a xylene insoluble matter obtained through Soxhlet extraction of the expanded composite resin bead using xylene and an acetone insoluble matter contained in a xylene solution after the Soxhlet extraction, is preferably not lower than 1.25.

From a standpoint of stably expressing restorability, a bulk density of the expanded composite resin bead is preferably not smaller than 5 kg/m$^3$ and more preferably not smaller than 8 kg/m$^3$. On the other hand, the bulk density of the expanded composite resin bead is preferably not larger than 200 kg/m$^3$, more preferably not larger than 100 kg/m$^3$, further preferably not larger than 50 kg/m$^3$, and even further preferably not larger than 35 kg/m$^3$.

The expanded composite resin bead preferably exhibits, at a foam cell wall part thereof, a morphology (island-sea structure) in which the polyethylene resin forms a dispersed phase and the polystyrene resin forms a continuous phase, and exhibit, at a resin accumulation part where the foam cell wall parts are connected with each other, a morphology (sea-island structure) in which the polyethylene resin forms a continuous phase and the polystyrene resin forms a dispersed phase. In this case, the expanded composite resin bead can express further excellent restorability.

The expanded composite resin bead exhibiting the above described morphologies can be obtained by expanding the expandable composite resin beads according to the present application. The reason for that is thought to be because the polystyrene resin component is also in an easily extendable state sufficiently at the time of expanding since the organic physical blowing agent plasticizes the polystyrene resin.

The expanded composite resin bead can be used for a mattress or a cushion when a bag-like body is filled with the expanded composite resin bead. In this case, the above described properties of the expanded composite resin bead of being lightweight and having both rigidity and restorability can be sufficiently utilized.

The expanded composite resin bead can also be used not only for the use application as a cushion as described above, but also for use application in in-mold molding. Also in this case, high rigidity and excellent restorability can both be achieved while being lightweight. More specifically, by in-mold molding the expanded composite resin bead with known molding means, a foamed resin molded article can be obtained.

The foamed resin molded article is formed from a composite resin containing a polyethylene resin and a polystyrene resin. The composite resin contains 5 to 20 mass % of the polyethylene resin and 80 to 95 mass % of the polystyrene resin (wherein a total of both thereof is 100 mass %). A swelling degree, in methyl ethyl ketone at a temperature of 23° C., of a mixed insoluble matter of a xylene insoluble matter obtained through Soxhlet extraction of the foamed resin molded article using xylene and an acetone insoluble matter contained in a xylene solution after the Soxhlet extraction, is preferably not lower than 1.25.

From a standpoint of stably expressing restorability, an apparent density of the foamed resin molded article is preferably not smaller than 5 kg/m³ and more preferably not smaller than 8 kg/m³. On the other hand, the apparent density of the foamed resin molded article is preferably not larger than 200 kg/m³, more preferably not larger than 100 kg/m³, further preferably not larger than 50 kg/m³, and particularly preferably not larger than 35 kg/m³.

The foamed resin molded article preferably exhibits, at a foam cell wall part thereof, a morphology (island-sea structure) in which the polyethylene resin forms a dispersed phase and the polystyrene resin forms a continuous phase, and exhibits, at a resin accumulation part where the foam cell wall parts are connected with each other, a morphology (sea-island structure) in which the polyethylene resin forms a continuous phase and the polystyrene resin forms a dispersed phase. In this case, the foamed resin molded article can express further excellent restorability.

The composite resin of the foamed resin molded article and the composite resin of the expanded composite resin bead normally exhibit the morphologies having the same configuration.

The swelling degrees of the expanded composite resin bead and the foamed resin molded article can be measured using the method for measuring the swelling degree of the expandable composite resin bead, except that test pieces cut out from the expanded composite resin bead and the foamed resin molded article are each used as a test sample.

Furthermore, the morphologies of the composite resins in the expanded composite resin bead and the foamed resin molded object can be observed with the above described technique for observing the morphology of the expandable composite resin bead, except that a test piece cut out from the central part of the expanded composite resin bead and a test piece cut out from the central part of one of the expanded beads forming the foamed resin molded article are each used as a test sample.

The foamed resin molded article preferably has a closed-cell rate of not lower than 80%. In this case, the foamed resin molded article can express the excellent restorability with further certainty while having excellent rigidity. A method for measuring the closed-cell rate will be described later in the Examples.

The foamed resin molded article preferably has a compression set of not higher than 10%. In this case, the foamed resin molded article can express the excellent restorability with certainty. The compression set of the foamed resin molded article is more preferably not higher than 8% and further preferably not higher than 6%. A method for measuring the compression set will be described later in the Examples.

When the apparent density, the 50%-compressive stress, and the compression set of the foamed resin molded article are respectively defined as C [kg/m³], D [kPa], and E [%]; the relationship in the following formula (1) is preferably satisfied, the relationship in the following formula (2) is more preferably satisfied, and the relationship in the following formula (3) is further preferably satisfied. A method for measuring the compressive stress will be described later in the Examples.

$$C \times E \leq 1000000 \, e^{-200(E/D)} \quad (1)$$

$$C \times E \leq 1000000 \, e^{-230(E/D)} \quad (2)$$

$$C \times E \leq 1000000 \, e^{-260(E/D)} \quad (3)$$

EXAMPLES

In the following, Examples and Comparative Examples of the expandable composite resin beads will be described. It is to be noted that the present invention is not limited to the examples.

Example 1

In the present example, expandable composite resin beads according to the Examples are prepared, and, by using the expandable composite resin beads, expanded composite resin beads and a foamed resin molded article (molded article formed from expanded composite resin beads) are prepared.

The expandable composite resin beads comprise a composite resin of a polyethylene resin and a polystyrene resin, and an organic physical blowing agent impregnated in the composite resin. The organic physical blowing agent includes a saturated hydrocarbon compound. In the following, a method for producing the expandable composite resin beads of the present example will be described.

(1) Preparation of Nuclear Beads

As the polyethylene resin, a linear low density polyethylene ("Nipolon Z 9P51A" manufactured by Tosoh Corp.) obtained through polymerization using a metallocene polymerization catalyst was prepared. Hereinafter, this polyethylene resin is referred to as a "resin A." The melting point Tm (° C.) and the Vicat softening temperature Tv (° C.) of the resin A, and the difference (Tm–Tv: ° C.) of these are shown in Table 1 described later. As the dispersion diameter enlarging agent, an acrylonitrile-styrene copolymer ("AS-XGS" manufactured by Denki Kagaku Kogyo Co., Ltd., weight average molecular weight: 109000, amount of acrylonitrile component: 28 mass %, MFR (200° C., 5 kgf): 2.8 g/10 min) was prepared. Then, 20 kg of the polyethylene resin and 1 kg of the dispersion diameter enlarging agent were added in a Henschel mixer (type FM-75E manufactured by Mitsui Miike Chemical Engineering Machinery, Co., Ltd.), and mixed for 5 minutes to obtain a resin mixture.

Next, by using an extruder (type MS50-28 manufactured by IKG Corp.; 50 mmø single-screw extruder, Maddock type screw), the resin mixture was melt-kneaded at a temperature of 230 to 250° C., and cut to 0.4 to 0.6 mg/piece (average: 0.5 mg/piece) using an underwater cutting method to obtain nuclear beads (polyethylene resin nuclear beads).

(2) Preparation of Expandable Composite Resin Bead

In an autoclave equipped with a stirring device and having an internal volume of 3 L, 1000 g of deionized water and then 6.0 g of sodium pyrophosphate were added. Then, 12.9 g of magnesium nitrate hexahydrate in a powder form was added thereto, and the mixture was stirred for 30 minutes at room temperature. As a result, a slurry of magnesium pyrophosphate was prepared as a suspending agent.

Next, to this suspending agent, 1.25 g of sodium lauryl sulfonate (10 mass % aqueous solution) as a surfactant, 0.15 g of sodium nitrite as a water-soluble polymerization inhibitor, and 75 g of the nuclear beads were added.

Next, as a polymerization initiator, 1.715 g of t-butylperoxy-2-ethylhexyl monocarbonate ("Perbutyl E" manufactured by NOF Corp.) was dissolved in a first monomer (styrene monomer). Then, while stirring the suspending agent at a stirring speed of 500 rpm, the dissolution object was added into the suspending agent in the autoclave (dispersion step). As the first monomer, a mixed monomer of 60 g of styrene and 15 g of butyl acrylate was used.

Next, after the air inside of the autoclave was replaced with nitrogen gas, heating was initiated, and the temperature was raised to 100° C. over the course of 1 hour minutes. After the temperature was raised, the temperature was maintained at 100° C. for 60 minutes. Then, the stirring speed was lowered to 450 rpm, and the polymerization temperature of 100° C. was maintained for 7 hours 30 minutes (modification step). When 60 minutes had elapsed after reaching the temperature of 100° C., 350 g of styrene was added to the autoclave over the course of 5 hours as a second monomer (styrene monomer).

Next, the temperature was raised to 125° C. over the course of 2 hours, and the temperature was maintained at 125° C. for 5 hours. Then, the temperature was lowered to 90° C. over the course of 1 hour, the stirring speed was lowered to 400 rpm, and the temperature was maintained at 90° C. for 3 hours. When the temperature had reached 90° C., as an organic physical blowing agent, 20 g of cyclohexane, 15 g of pentane (a mixture of approximately 80 mass % of normal pentane and approximately 20 mass % of isopentane), and 50 g of butane (a mixture of approximately 20 mass % of normal butane and approximately 80 mass % of isobutane) were added to the autoclave over the course of approximately 1 hour (impregnation step). Furthermore, the temperature was raised to 105° C. over the course of 2 hours, maintained at 105° C. for 5 hours, and then lowered to 30° C. over the course of approximately 6 hours. It should be noted that the organic physical blowing agent of the composition used in the present example is described as "CH" in the table described later.

After the temperature was lowered, the content was taken out from the autoclave, and nitric acid was added thereto for dissolving magnesium pyrophosphate attached to the surface of resin beads. Then, the product was dewatered and rinsed using a centrifuge, and water content attached to the surface thereof was removed using a flash drying device to obtain expandable composite resin beads having an average particle diameter ($d_{63}$) of approximately 1.7 mm.

A transmission electron microscope picture (10000-fold magnification) of a cross section of a central part of one of the expandable composite resin beads obtained in the present example is shown in FIG. 1. As a transmission electron microscope, JEM1010 manufactured by JEOL Ltd. was used. In the same figure, a dark gray part indicates the polyethylene resin and a light gray part indicates the polystyrene resin. As shown in the same figure, an expandable composite resin bead 1 of the present example exhibited a morphology (sea-island structure) in which a polyethylene resin 2 of a composite resin 10 forms a continuous phase, and a polystyrene resin 3 of the composite resin 10 forms a dispersed phase. It should be noted that, in the same figure, a salami-like part existing in the phase of the polystyrene resin (light gray phase) is the dispersion diameter enlarging agent.

With respect to 100 parts by mass of the obtained expandable composite resin beads, 0.008 parts by mass of N,N-bis (2-hydroxyethyl)alkylamine which is an antistatic agent was added. Furthermore, a mixture of 0.12 parts by mass of zinc stearate, 0.04 parts by mass of glycerin monostearate, and 0.04 parts by mass of glycerin distearate was added for providing a coating for the expandable composite resin beads.

Regarding the obtained expandable composite resin beads as described above, Table 2 described later shows polymerization conditions: mass ratio of the polyethylene resin and the polystyrene resin, type of the polyethylene resin, the mass ratio (first monomer/polyethylene resin; mass ratio) of the first monomer with respect to the amount of the polyethylene resin (nuclear beads), the amount of the polymerization initiator (mass ratio (mass %) of the polymerization initiator with respect to the composite resin), and change of temperature control during polymerization. Regarding the expandable composite resin beads, the swelling degree, the proportion of the xylene insoluble matter, the weight average molecular weight (Mw) of the polystyrene resin, beads-life, the morphology of the composite resin containing the polyethylene resin (PE) and the polystyrene resin (PS), and the interface ratio of PE and PS were investigated in the following manner. The results are shown in Table 2 described later.

"Swelling Degree"

The swelling degree of the expandable composite resin beads was obtained with the following method.

Specifically, first, approximately 1 g of the expandable composite resin beads was collected, its weight ($W_0$) was weighed to the fourth decimal, and the weighed expandable composite resin beads were placed in a 150-mesh wire net bag. Next, approximately 200 ml of xylene was poured into a round shape flask having a volume of 200 ml, and a sample placed in the wire net bag was set in a Soxhlet extraction tube. The Soxhlet extraction was performed by applying heat to the flask with a mantle heater for 8 hours. After the extraction, the extraction tube was cooled by air cooling. After the cooling, the wire net was taken out from the extraction tube, and the sample, together with the wire net, was rinsed using approximately 600 ml of acetone. Next, the acetone was volatilized, and the sample was dried at a temperature of 120° C. After the drying, the sample recovered from the wire net is a "xylene insoluble matter."

A xylene solution obtained after the Soxhlet extraction was added to 600 ml of acetone. Then, components that did not dissolve in acetone were filtered and recovered using a No. 5A filter paper specified by JIS P3801, and the recovered object underwent evaporation to dryness under reduced pressure. The obtained solid matter is an "acetone insoluble matter."

The weight ($W_a$) of a mixed insoluble matter of the "xylene insoluble matter" and the "acetone insoluble matter" obtained from these operations was weighed to the fourth decimal point. The same described above applies also for the other Examples. It should be noted that, in other Examples, when the weight of the mixed insoluble matter was less than 0.2 g, the above described operations were repeated until 0.2 g or more of the mixed insoluble matter was obtained in order to obtain a sufficient amount of the mixed insoluble matter.

Next, the mixed insoluble matter was immersed in 50 ml of methyl ethyl ketone, and was kept for 24 hours at a temperature of 23° C. Then, the mixed insoluble matter was taken out from methyl ethyl ketone, gently wiped using a filter paper, and the weight ($W_b$) of the mixed insoluble matter was weighed to the fourth decimal point. Then, a swelling degree S was obtained from the following formula (4) based on the weights ($W_a$, $W_b$) of the mixed insoluble matter before and after being immersed in methyl ethyl ketone. The swelling degrees of the expanded composite resin beads and foamed resin molded article described later were measured in a similar manner as the method described above, except for using, as a sample, a test piece cut out from the expanded composite resin beads or the foamed resin molded article.

$$S=W_b/W_a \quad (4)$$

"Proportion of Xylene Insoluble Matter"

A weight ($W_1$) which is a result of subtracting the weight of the blowing agent contained in the expandable composite resin beads from the weight ($W_0$) of the expandable composite resin beads weighed for the swelling degree was obtained. The proportion of the xylene insoluble matter is a proportion ($W_2/W_1$; percentage (%)) of the weight ($W_2$) of the xylene insoluble matter obtained through the measurement of the swelling degree with respect to the weight ($W_1$) of the expandable composite resin beads having subtracted therefrom the weight of the blowing agent.

"Weight Average Molecular Weight (Mw) of Polystyrene Resin"

First, Soxhlet extraction was performed similarly to the above described method. Then, the extracted xylene solution was added to 600 ml of acetone, and decantation and evaporation to dryness under reduced pressure were performed thereon. As a result, the polystyrene resin was obtained as an acetone soluble matter.

The weight average molecular weight of the polystyrene resin was measured with gel permeation chromatography (GPC) (mix gel column for macromolecule assay) using polystyrene as a standard substance. Specifically, a measuring device (HLC-8320 GPC EcoSEC) manufactured by Tosoh Corp., was used, and measurement was performed with measurement conditions of eluent: tetrahydrofuran (THF), flow rate: 0.6 ml/min, sample concentration: 0.1 wt %, and column: TSK guard column SuperH-H×1, and TSK-GEL SuperHM-H×2 connected in series. More specifically, the weight average molecular weight was obtained by dissolving the polystyrene resin in tetrahydrofuran, measuring thereof with gel permeation chromatography (GPC), and performing a correction using standard polystyrene.

"Beads-Life"

The expandable composite resin beads were kept for a predetermined time period in an open state at a temperature of 23° C. to dissipate the blowing agent from the expandable composite resin beads. Then, the expandable composite resin beads were foamed through heating for 270 seconds at a heating steam temperature of 107° C. to obtain expanded beads. Next, the expanded beads were dried for 24 hours at a temperature of 23° C. Next, the bulk density (kg/m$^3$) of the expanded beads after the drying was measured. The bulk density (kg/m$^3$) was obtained by preparing a 1-L measuring cylinder, filling the empty measuring cylinder to the 1-L marked line with the expanded beads, measuring the mass (g) of the expanded beads per 1 L, and performing unit conversion thereon. The definition of beads-life is the kept time period (days) during which expanded beads having a bulk density of 20 kg/m$^3$ and below were obtained, i.e., the kept time period (days) until expanded beads having a bulk density of 20 kg/m$^3$ and below cannot be obtained.

"Morphology of Composite Resin and Interface Ratio of PE and PS"

A sample for observation was cut out from the central part of one of the expandable composite resin beads. The sample for observation was embedded in an epoxy resin, stained using ruthenium tetraoxide, and an ultra-thin section was prepared therefrom using an ultramicrotome. The ultra-thin section was placed on a grid, the morphology of the cross section of a central part (center part) of one of the expandable composite resin beads was observed by a transmission electron microscope (JEM1010 manufactured by JEOL Ltd.) at a 10000-fold magnification, and a cross-sectional picture (TEM picture) was captured. From the cross-sectional picture, the morphology of the phase of the polyethylene resin (PE) and the phase of the polystyrene resin (PS) in the expandable composite resin beads was visually observed. It should be noted that the morphologies of the composite resins in the expanded composite resin beads and the foamed resin molded article described later were observed using a method similar to that described above; except for using, as a sample for observation, a test piece cut out from the central part of one of the expanded composite resin beads or a test piece cut out from the central part of one of the expanded beads forming the foamed resin molded article, and performing the observation using a transmission electron microscope (JEM1010 manufactured by JEOL Ltd.) with a 50000-fold magnification.

Next, the cross-sectional picture was captured using a scanner (600 dpi; color picture). The captured image was analyzed using image-processing software (NanoHunter NS2K-Pro by Nano System Corp.), and interface ratios were measured for all phases (10 or more) of PE and PS in a transmission electron microscope picture (preferably 10000-fold magnification) of a cross section of a central part (a central part of a cross section dividing the expandable composite resin bead into two equal parts) of the expandable composite resin bead. The interface ratio refers to a sum total of the length (μm) of the interface between PE and PS observed in the transmission electron microscope picture of the cross section of a central part (a central part of a cross section dividing the expandable composite resin bead into two equal parts) of the expandable composite resin bead.

The above described operations were performed on five of the expandable composite resin beads selected randomly, and a value obtained by dividing the sum total of the length (μm) of the interface between PE and PS existing in five or more of the microscope pictures by the area (μm$^2$) of the observed range was defined as the interface ratio (μm/μm$^2$) of PE and PS.

When obtaining the interface ratio of PE and PS using the image-processing software, processing conditions of the following (1) to (5) were used.

(1) Monochrome conversion→(2) smoothing filter (3×3, close to 8, number of processes=1)→(3) NS method binarization (brighter than background, visibility factor=70, sensitivity=5, noise removal, concentration range=0 to 255)→(4) selection of only images using characteristic amount (area) (0.01 to ∞ μm$^2$, close to 8)→(5) surrounding length (interface length) measurement.

(3) Preparation of Expanded Composite Resin Beads

Next, by using the expandable composite resin beads obtained as described above, expanded composite resin beads having a bulk density of approximately 20 kg/m$^3$ were prepared.

Specifically, first, the expandable composite resin beads were placed in an ordinary-pressure batch-expanding machine having a capacity of 30 L, and steam was supplied into the expanding machine. With this, the expandable composite resin beads were foamed and expanded to a bulk density of approximately 20 kg/m$^3$, and expanded composite resin beads with bulk expansion ratio of 50-fold were obtained.

It should be noted that the bulk density (kg/m$^3$) of the expanded composite resin beads can be measured by performing an operation similar for the bulk density of the expanded beads in the method for evaluating the beads-life of the expandable composite resin beads described above. Through unit conversion of the mass of the expanded beads per bulk volume of 1 L obtained with this operation, the bulk density (kg/m$^3$) of the expanded composite resin beads was obtained.

Figure 2:
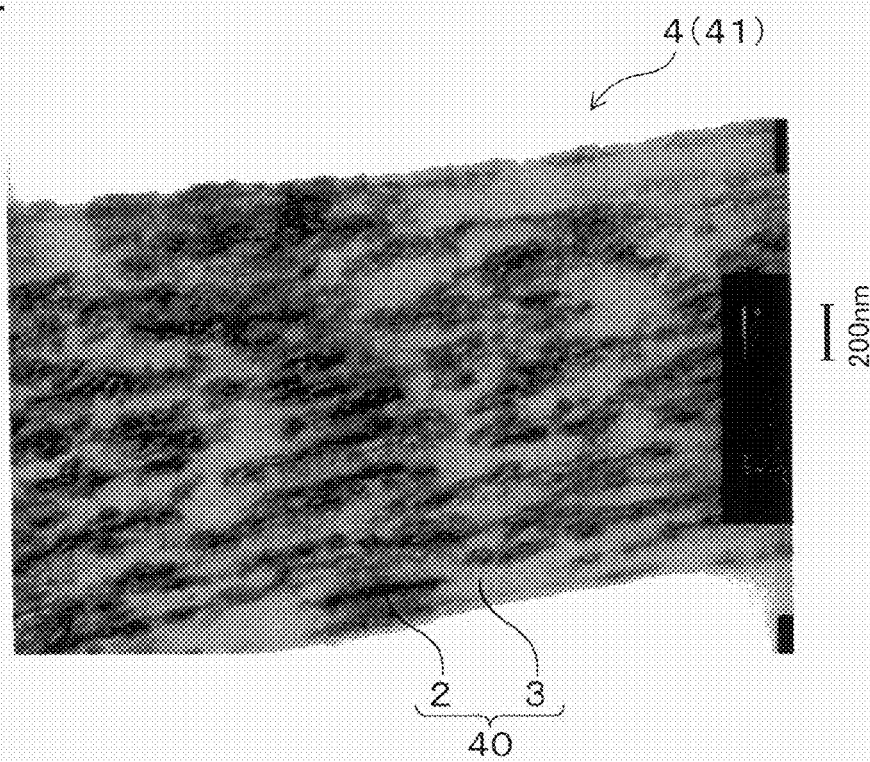
FIG. 2 shows a transmission electron microscope picture of a foam cell wall part at a cross section of a central part of an expanded composite resin bead in Example 1.
Figure 3:
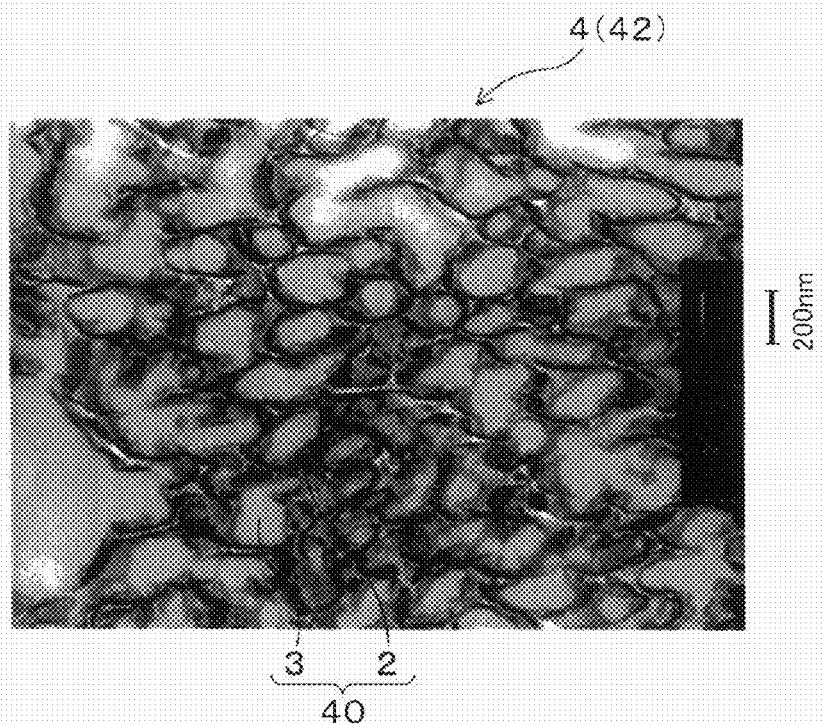
FIG. 3 shows a transmission electron microscope picture of a resin accumulation part at a cross section of a central part of an expanded composite resin bead in Example 1.

Transmission electron microscope pictures (50000-fold magnification) of cross-sections of central parts of one of the expanded composite resin beads obtained in the present example are shown in FIGS. 2 and 3. As a transmission electron microscope, JEM1010 manufactured by JEOL Ltd. was used. In the same figures, a dark gray part indicates the polyethylene resin and a light gray part indicates the polystyrene resin. As shown in FIG. 2, an expanded composite resin bead 4 of the present example exhibited, at a foam cell wall part 41 thereof, a morphology (island-sea structure) in which the polyethylene resin 2 of a composite resin 40 forms a dispersed phase, and the polystyrene resin 3 of the composite resin 40 forms a continuous phase. Furthermore, as shown in FIG. 3, the expanded composite resin bead 4 of the present example exhibited, at a resin accumulation part 42 thereof, a morphology (sea-island structure) in which the polyethylene resin 2 of the composite resin 40 forms a continuous phase and the polystyrene resin 3 forms a dispersed phase.

(4) Preparation of Foamed Resin Molded Article (Molded Article Formed from Expanded Composite Resin Beads)

First, the expanded composite resin beads obtained as described above were aged for 1 day at room temperature. Next, by using a molding machine (DSM-0705VS manufactured by DABO Co., Ltd.), the expanded composite resin beads were molded into a molded article having a rectangular parallelepiped shape of 300 mm×75 mm×25 mm. The obtained molded article was dried for 1 day at a temperature of 40° C., and then aged for 1 day or longer at room temperature.

In this manner, the expanded composite resin beads having a bulk density of approximately 20 kg/m$^3$ were molded to obtain a foamed resin molded article having an expansion ratio of 50. It should be noted that an expansion ratio of a foamed resin molded article can be calculated from the following formula (5), by calculating an apparent density (kg/m$^3$) by dividing the mass of the molded article with its volume.

Expansion ratio(-fold)=1000/apparent density (kg/m$^3$)     (5)

Next, for the foamed resin molded article, a 50%-compressive stress (kPa), a compression set (%), closed-cell rates (%) before and after the compression-set test, and a ratio of closed-cell rates before and after the compression-set test (closed-cell rate after compression-set test/closed-cell rate before compression-set test) were measured in the following manner. From these results, conformity to the above described formula (1) of C×E≤1000000 e$^{-200(E/D)}$ was judged. If conformity to formula (1) is observed, an evaluation of "conformance" is made and if conformity to formula (1) is not observed, an evaluation of "non-conformance" is made. The results are shown in Table 2.

"50%-Compressive Stress"

A plate-like test piece having a height of 50 mm, a width of 50 mm, and a thickness of 25 mm was cut out from the foamed resin molded article, and a compression test was performed in accordance with JIS K 7220 (2006). It should be noted that a compressional stress when the compression set is 50% is a 50%-compressional stress (kPa).

"Compression Set"

A plate-like test piece having a height of 50 mm, a width of 50 mm, and a thickness of 25 mm was cut out from the foamed resin molded article, and a compression set (%) was measured in accordance with JIS K 6767 (1999).

"Closed-Cell Rate"

After a cubical test piece having a height of 25 mm, a width of 25 mm, and a thickness of 25 mm was cut out from the foamed resin molded article, the test piece was kept for 1 day in a constant temperature room with relative humidity of 50% and temperature of 23° C. under atmospheric pressure. Next, the precise apparent volume $V_a$ of the test piece was measured. Next, after sufficiently drying the test piece, the true volume $V_x$ of the test piece was measured using a model 930 air comparison pycnometer manufactured by Toshiba-Beckman, Inc., based on procedure C set forth in ASTM-D2856-70. A closed-cell rate was calculated from the following formula (6) based on the volume values $V_a$ and $V_x$. It should be noted that the measurement and calculation were performed on 5 different test pieces, and an average of those was obtained. This average was used as a closed-cell rate.

Closed-cell rate (%)=($V_x$−W/ρ)×100/($V_a$−W/ρ)     (6)

($V_x$: True volume of the foamed resin molded article measured using the above described method, i.e., a sum (cm$^3$) of the volume of the resin forming the foamed resin molded article and a total volume of foams at the closed-cell parts in the foamed resin molded article. $V_a$: Apparent volume (cm$^3$) of the foamed resin molded article measured as the amount of water level rise when the foamed resin molded article is sunk in water in a measuring cylinder. W: Weight (g) of the foamed resin molded article. ρ: Density (g/cm$^3$) of the composite resin forming the foamed resin molded article.)

In the present example, the closed-cell rates of the foamed resin molded article before the compression-set test and after the compression-set test were obtained based on the above described measuring method. With regard to the closed-cell rate after the compression-set test, the volume after the compression-set test was taken into consideration, and a corrected value obtained from the following formula (7) was used.

Closed-cell rate (corrected value after compression-set test: (%))=Closed-cell rate (actual measurement value after compression-set test: (%))×(100−compression set (%))/100     (7)

Example 2

Figure 4:
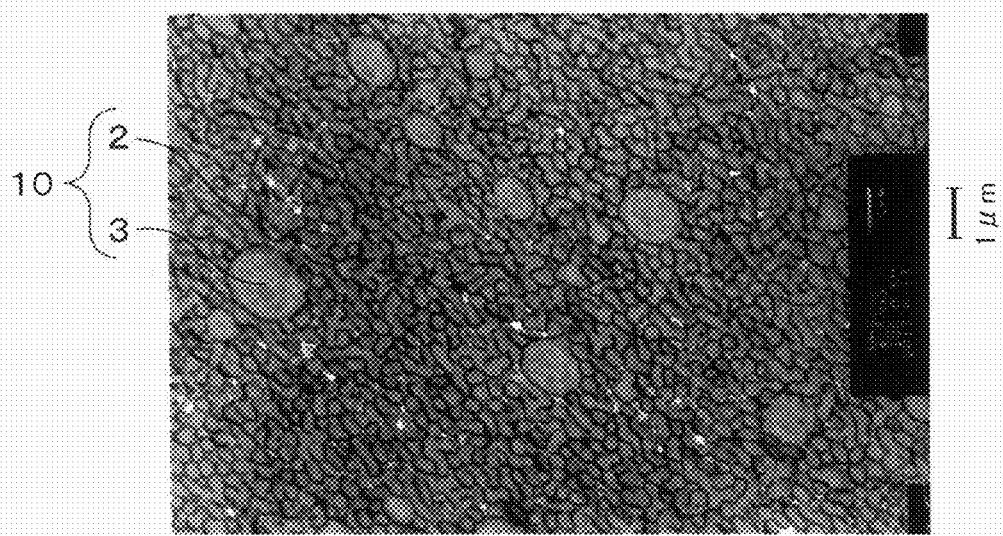
FIG. 4 shows a transmission electron microscope picture of a cross section of a central part of an expandable composite resin bead in Example 2.

In the present example, expandable composite resin beads were prepared similarly to Example 1, except for changing the added amount of the nuclear beads to 100 g, using 85 g of styrene and 15 g of butyl acrylate as the first monomer, and using 300 g of styrene as the second monomer. A transmission electron microscope picture (10000-fold magnification) of a cross section of a central part of one of the expandable composite resin beads obtained in the present example is shown in FIG. 4. As shown in the same figure, the expandable composite resin bead 1 of the present example exhibited a morphology (sea-island structure) in which the polyethylene resin 2 of the composite resin 10 forms a continuous phase, and the polystyrene resin 3 of the composite resin 10 forms a dispersed phase.

Figure 5:
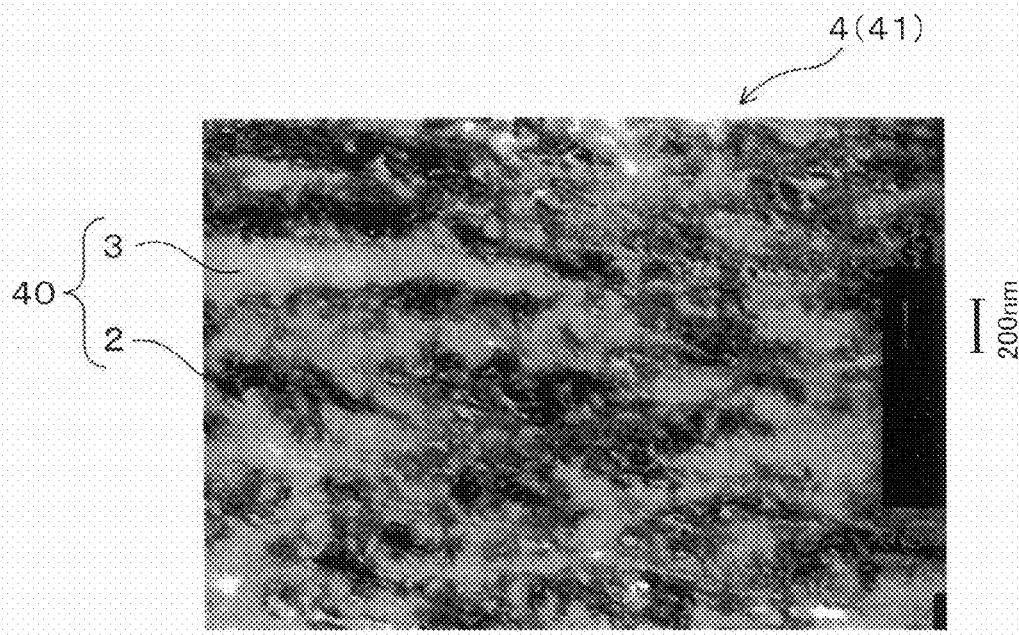
FIG. 5 shows a transmission electron microscope picture of a foam cell wall part at a cross section of a central part of an expanded composite resin bead in Example 2.
Figure 6:
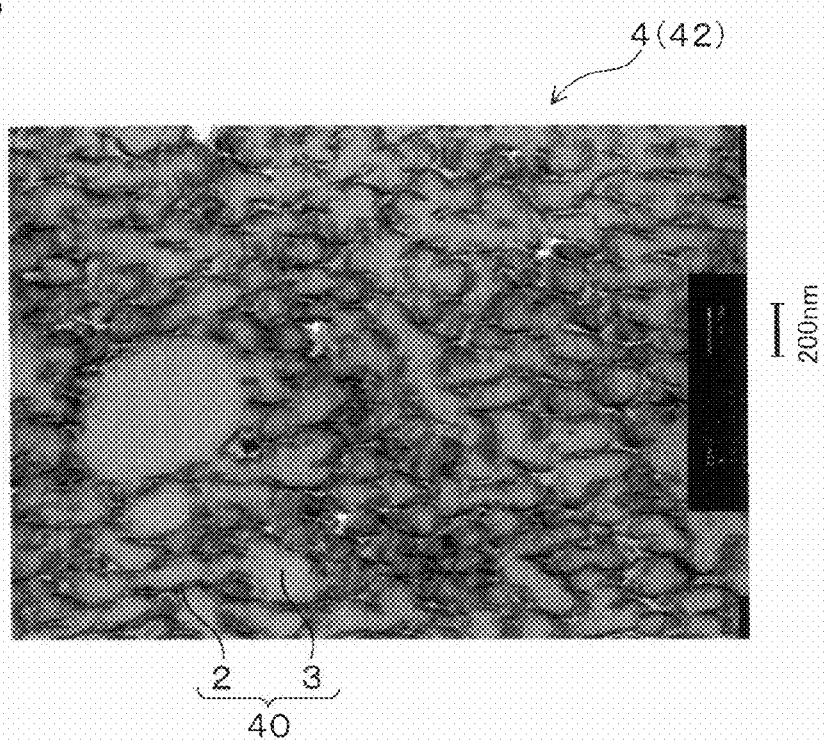
FIG. 6 shows a transmission electron microscope picture of a resin accumulation part at a cross section of a central part of an expanded composite resin bead in Example 2.

Furthermore, expanded composite resin beads were prepared similarly to Example 1 using the expandable composite resin beads obtained in the present example. Transmission electron microscope pictures (50000-fold magnification) of cross-sections of central parts of those are shown in FIGS. 5 and 6. As a transmission electron microscope, JEM1010 manufactured by JEOL Ltd. was used. In the same figures, a dark gray part indicates the polyethylene resin and a light gray part indicates the polystyrene resin. As shown in FIG. 5, the expanded composite resin bead 4 of the present example exhibited, at the foam cell wall part 41 thereof, a morphology (island-sea structure) in which the polyethylene resin 2 of the composite resin 40 forms a dispersed phase and the polystyrene resin 3 of the composite resin 40 forms a continuous phase. Furthermore, as shown in FIG. 6, the expanded composite resin bead 4 of the present example exhibited, at the resin accumulation part 42 thereof, a morphology (sea-island structure) in which the polyethylene resin 2 of the composite resin 40 forms a continuous phase and the polystyrene resin 3 of the composite resin 40 forms a dispersed phase.

Example 3

In the present example, expandable composite resin beads were prepared similarly to Example 1, except for changing the added amount of the nuclear beads to 62.5 g, using 47.5 g of styrene and 15 g of butyl acrylate as the first monomer, and using 375 g of styrene as the second monomer.

Example 4

In the present example, expandable composite resin beads were prepared similarly to Example 1, except for changing the added amount of the nuclear beads to 50 g, changing the added amount of sodium nitrite to 0.3 g, using 35 g of styrene and 15 g of butyl acrylate as the first monomer, and using 400 g of styrene as the second monomer.

Example 5

Figure 7:
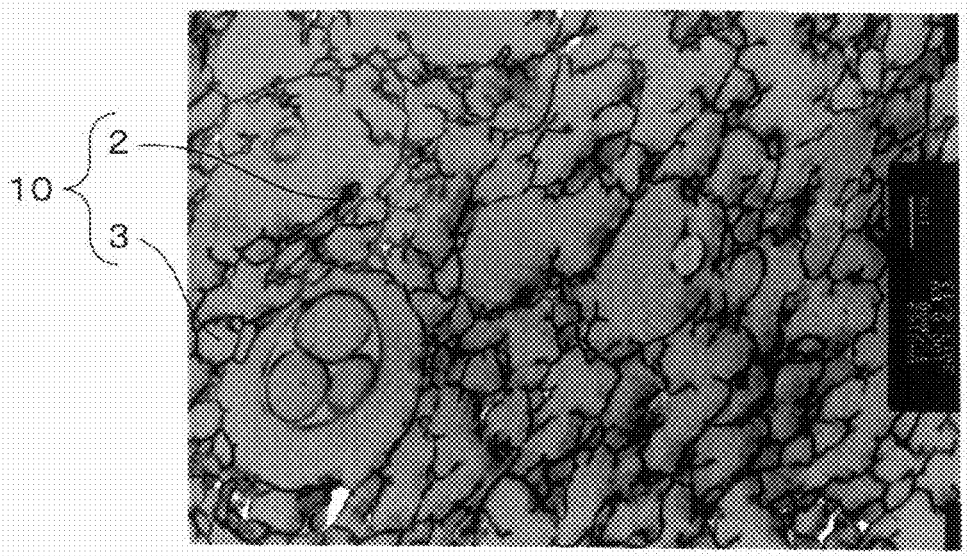
FIG. 7 shows a transmission electron microscope picture of a cross section of a central part of an expandable composite resin bead in Example 5.

In the present example, expandable composite resin beads were prepared similarly to Example 1, except for changing the added amount of the nuclear beads to 25 g, changing the added amount of sodium nitrite to 0.3 g, using 10 g of styrene and 15 g of butyl acrylate as the first monomer, and using 450 g of styrene as the second monomer. A transmission electron microscope picture (10000-fold magnification) of a cross section of a central part of one of the expandable composite resin beads obtained in the present example is shown in FIG. 7. As shown in the same figure, the expandable composite resin bead 1 of the present example exhibited a morphology (sea-sea structure) in which a phase formed from the polyethylene resin 2 of the composite resin 10 and a phase formed from the polystyrene resin 3 of the composite resin 10 form a co-continuous phase.

Figure 8:
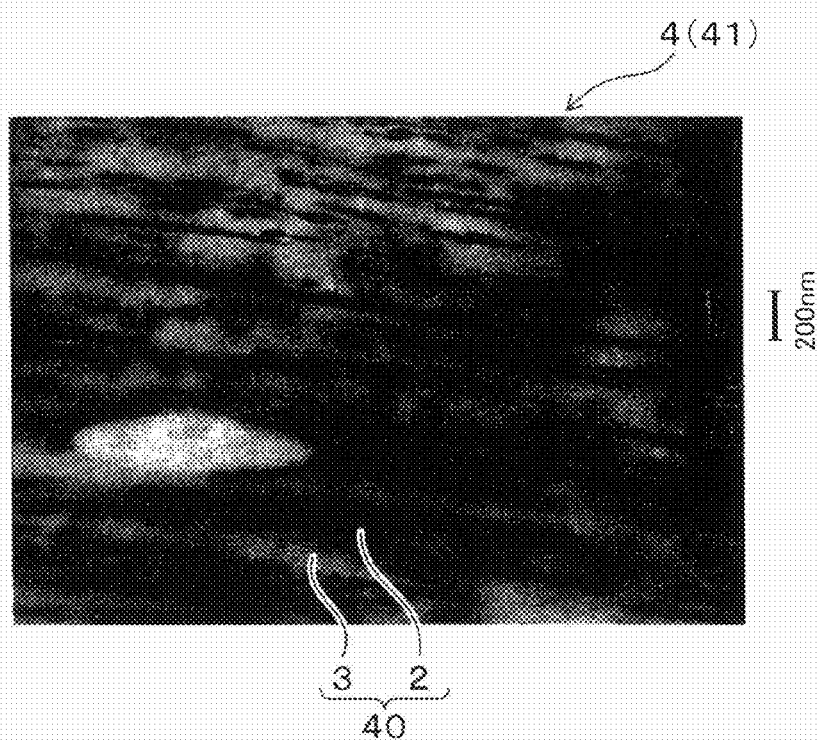
FIG. 8 shows a transmission electron microscope picture of a foam cell wall part at a cross section of a central part of an expanded composite resin bead in Example 5.
Figure 9:
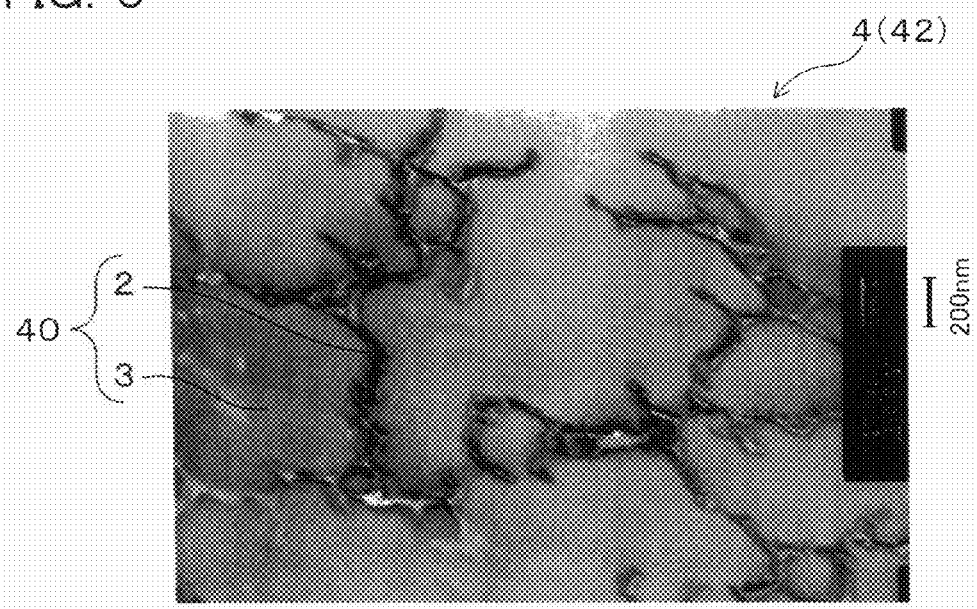
FIG. 9 shows a transmission electron microscope picture of a resin accumulation part at a cross section of a central part of an expanded composite resin bead in Example 5.

Furthermore, expanded composite resin beads were prepared similarly to Example 1 using the expandable composite resin beads obtained in the present example. Transmission electron microscope pictures (50000-fold magnification) of cross-sections of central parts of those are shown in FIGS. 8 and 9. As a transmission electron microscope, JEM1010 manufactured by JEOL Ltd. was used. In the same figures, a dark gray to black part indicates the polyethylene resin, and a light gray part indicates the polystyrene resin. As shown in FIG. 8, the expanded composite resin bead 4 of the present example exhibited, at the foam cell wall part 41 thereof, a morphology (island-sea structure) in which the polyethylene resin 2 of the composite resin 40 forms a dispersed phase and the polystyrene resin 3 of the composite resin 40 forms a continuous phase. Furthermore, as shown in FIG. 9, the expanded composite resin bead 4 of the present example exhibited, at the resin accumulation part 42 thereof, a morphology (sea-island structure) in which the polyethylene resin 2 of the composite resin 40 forms a continuous phase and the polystyrene resin 3 of the composite resin 40 forms a dispersed phase. It should be noted that, in the expanded composite resin beads of the present example, parts of the dispersed phases were bound since the amount of the polyethylene resin component was small.

Example 6

In the present example, expandable composite resin beads were prepared similarly to Example 1, except for using a linear low density polyethylene ("Kernel KF270" manufactured by Japan Polyethylene Corp.) as the polyethylene resin. The polyethylene resin used in the present example is referred to as a "resin B." The melting point Tm (° C.) and the Vicat softening temperature Tv (° C.) of the resin B, and the difference (Tm−Tv: ° C.) of these are shown in Table 1 described later.

Example 7

In the present example, expandable composite resin beads were prepared similarly to Example 1, except for using "Evolue SP0510" manufactured by Prime Polymer Co., Ltd., as the polyethylene resin. The polyethylene resin used in the present example is referred to as a "resin C." The melting point Tm (° C.) and the Vicat softening temperature Tv (° C.) of the resin C, and the difference (Tm−Tv: ° C.) of these are shown in Table 1 described later.

Example 8

In the present example, expandable composite resin beads were prepared similarly to Example 1, except for using an ethylene-vinyl acetate copolymer ("Ultrathene 626" manufactured by Tosoh Corp.) as the polyethylene resin. The polyethylene resin used in the present example is referred to as a "resin D." The melting point Tm (° C.) and the Vicat softening temperature Tv (° C.) of the resin D, and the difference (Tm−Tv: ° C.) of these are shown in Table 1 described later.

Example 9

In the present example, expandable composite resin beads were prepared similarly to Example 1, except for using a low density polyethylene ("Sumikathene L716-H" manufactured by Sumitomo Chemical Co., Ltd.) as the polyethylene resin. The polyethylene resin used in the present example is referred to as a "resin E." The melting point Tm (° C.) and the Vicat softening temperature Tv (° C.) of the resin E, and the difference (Tm−Tv: ° C.) of these are shown in Table 1 described later.

Example 10

In the present example, expandable composite resin beads were prepared similarly to Example 1, except for using a linear low density polyethylene ("Sumikathene-E FV203" manufactured by Sumitomo Chemical Co., Ltd.) as the polyethylene resin. The polyethylene resin used in the present example is referred to as a "resin F." The melting point Tm (° C.) and the Vicat softening temperature Tv (° C.) of the resin F, and the difference (Tm−Tv: ° C.) of these are shown in Table 1 described later.

Example 11

In the present example, expandable composite resin beads were prepared similarly to Example 1, except for changing the usage amount of t-butylperoxy-2-ethylhexyl monocarbonate ("Perbutyl E" manufactured by NOF Corp.) used as the polymerization initiator to 0.86 g.

Example 12

In the present example, expandable composite resin beads were prepared similarly to Example 1, except for changing the usage amount of t-butylperoxy-2-ethylhexyl monocarbonate ("Perbutyl E" manufactured by NOF Corp.) used as the polymerization initiator to 2.58 g.

Example 13

In the present example, expandable composite resin beads were prepared similarly to Example 1, and expanded composite resin beads were prepared similarly to Example 1 except for expanding the expandable composite resin beads by 30-fold.

Example 14

In the present example, expandable composite resin beads were prepared similarly to Example 1. Expanded composite resin beads were also prepared similarly to Example 1 except for expanding the expandable composite resin beads by 50-fold to prepare primary expanded beads, aging the primary expanded beads at room temperature for 1 day, placing the primary expanded beads in a 30-L ordinary-pressure batch-expanding machine, and supplying steam in the expanding machine and expanding the primary expanded beads by 100-fold to obtain secondary expanded beads (expanded composite resin beads).

Comparative Example 1

First, nuclear beads and a suspending agent (magnesium pyrophosphate slurry) were prepared similarly to Example 1. Next, to the suspending agent, 1.5 g of sodium lauryl sulfonate (10 mass % aqueous solution) as a surfactant, 0.5 g of sodium nitrite as a water-soluble polymerization inhibitor, and 100 g of the nuclear beads were added.

Next, as polymerization initiators, 1.29 g of benzoyl peroxide ("Nyper BW" manufactured by NOF Corp., water-diluted fine-particle article) and 2.58 g of t-butylperoxy-2-ethylhexyl monocarbonate ("Perbutyl E" manufactured by NOF Corp.), and, as a crosslinking agent, 0.86 g of di-cumyl peroxide ("Percumyl D" manufactured by NOF Corp.) were dissolved in a first monomer (styrene monomer). Then, while stirring the suspending agent at a stirring speed of 500 rpm, the dissolution object was added into the suspending agent in the autoclave. As the first monomer, a mixed monomer of 185 g of styrene and 15 g of butyl acrylate was used.

Next, after the air inside of the autoclave was replaced with nitrogen gas, heating was initiated, and the temperature was raised to 88° C. over the course of 1 hour 30 minutes. After the temperature was raised, the temperature was maintained at 88° C. for 30 minutes. Then, the stirring speed was lowered to 450 rpm, and the temperature was lowered from 88° C. to 80° C. over the course of 30 minutes. Next, this polymerization temperature of 80° C. was maintained for 8 hours. When the temperature had reached 80° C., 200 g of styrene was added to the autoclave over the course of 5 hours as a second monomer (styrene monomer).

Next, the temperature was raised to 125° C. over the course of 4 hours, and the temperature was maintained at 125° C. for 2 hours 30 minutes. Then, the temperature was lowered to 90° C. over the course of 1 hour, the stirring speed was lowered to 400 rpm, and the temperature was maintained at 90° C. for 3 hours. When the temperature had reached 90° C., as a blowing agent, 20 g of cyclohexane and g of butane (a mixture of approximately 20 vol % of normal butane and approximately 80 vol % of isobutane) were added to the autoclave over the course of approximately 1 hour. Furthermore, the temperature was raised to 105° C. over the course of 2 hours, maintained at 105° C. for 5 hours, and then lowered to 30° C. over the course of approximately 6 hours.

Figure 10:
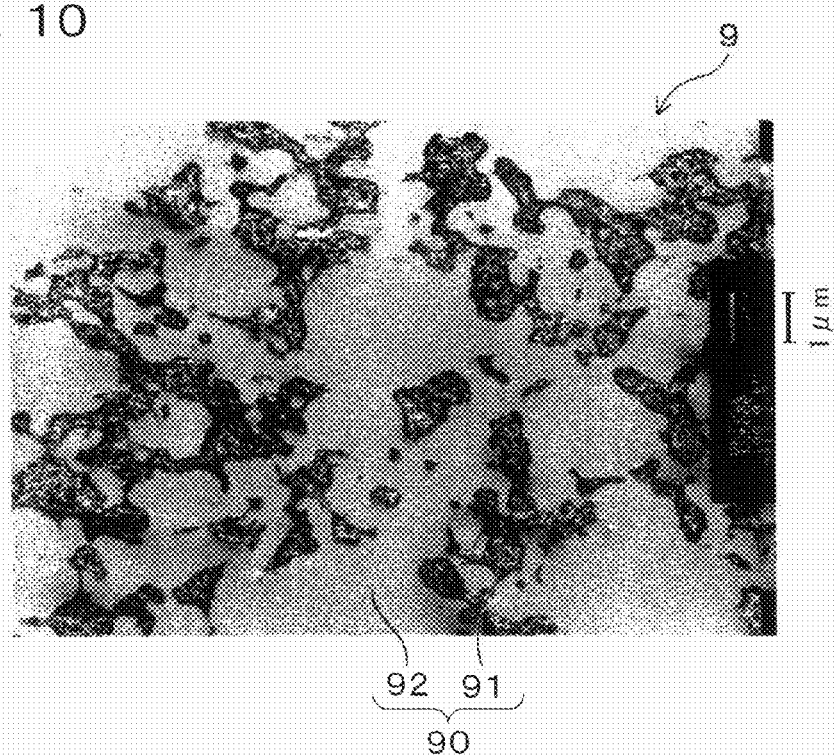
FIG. 10 shows a transmission electron microscope picture of a cross section of a central part of an expandable composite resin bead in Comparative Example 1.

After the temperature was lowered, the content was taken out from the autoclave, and nitric acid was added thereto for dissolving magnesium pyrophosphate attached to the surface of resin beads. Then, the product was dewatered and rinsed using a centrifuge, and water content attached to the surface thereof was removed using a flash drying device to obtain expandable composite resin beads having an average particle diameter ($d_{63}$) of approximately 1.4 mm. A transmission electron microscope picture (10000-fold magnification) of a cross section of a central part of one of the expandable composite resin beads obtained in the present example is shown in FIG. 10. As a transmission electron microscope, JEM1010 manufactured by JEOL Ltd. was used. In the same figure, a dark gray part indicates the polyethylene resin and a light gray part indicates the polystyrene resin. As shown in the same figure, an expandable composite resin bead 9 of the present example exhibited a morphology (sea-sea structure) in which a polyethylene resin 91 and a polystyrene resin 92 of a composite resin 90 form a co-continuous phase (sea-sea structure).

Furthermore, similarly to Example 1, an antistatic agent (N,N-bis(2-hydroxyethyl)alkylamine) was added to the obtained expandable composite resin beads, and a coating was provided thereto with a mixture of zinc stearate, glycerin monostearate, and glycerin distearate. The expandable composite resin beads were prepared in this manner.

Figure 11:
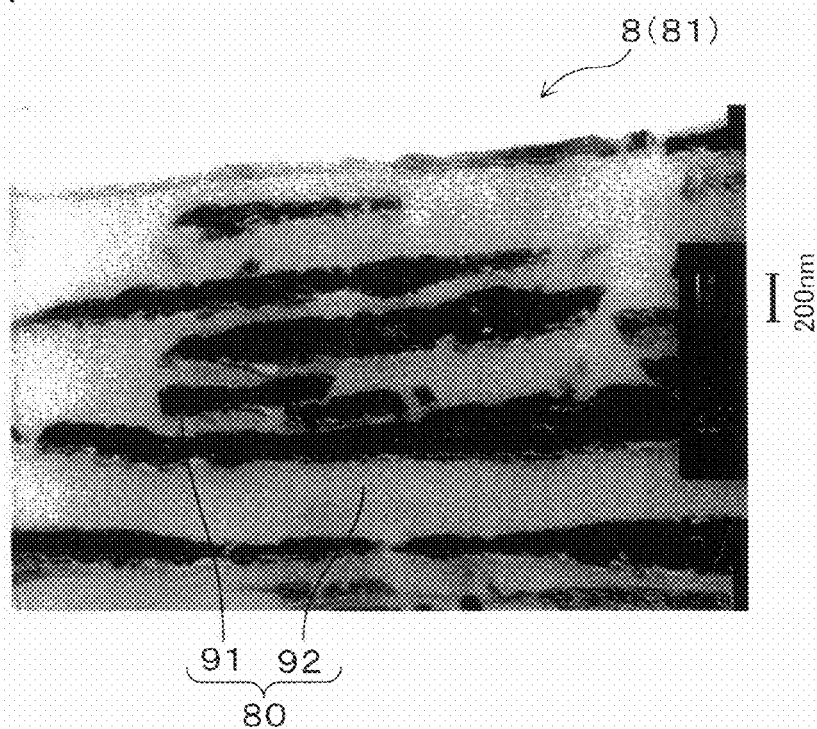
FIG. 11 shows a transmission electron microscope picture of a foam cell wall part at a cross section of a central part of an expanded composite resin bead in Comparative Example 1.
Figure 12:
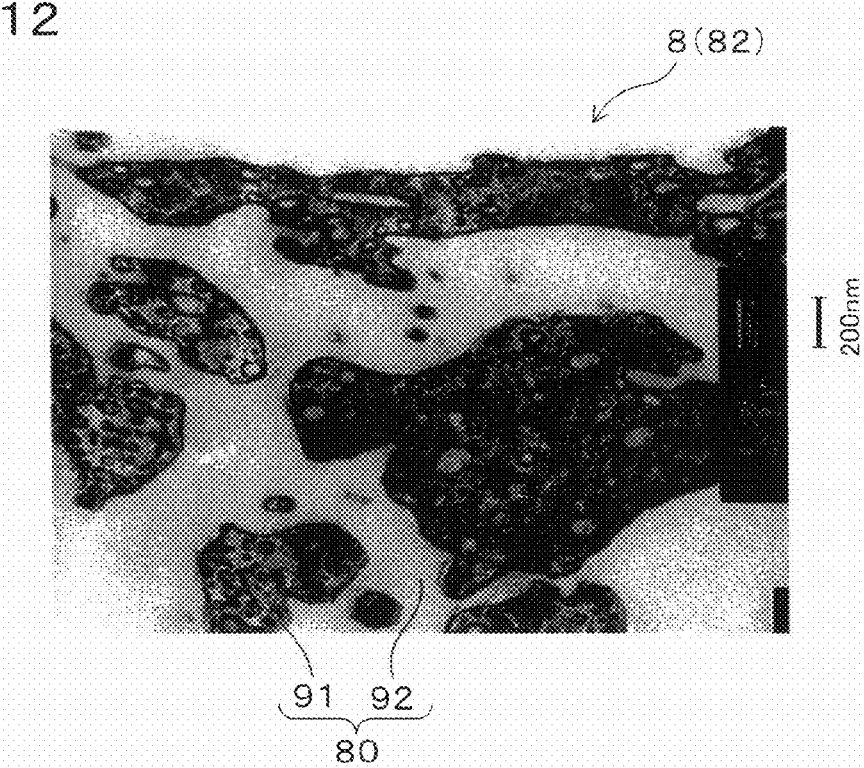
FIG. 12 shows a transmission electron microscope picture of a resin accumulation part at a cross section of a central part of an expanded composite resin bead in Comparative Example 1.

Furthermore, expanded composite resin beads were prepared similarly to Example 1 using the expandable composite resin beads obtained in the present example. Transmission electron microscope pictures (50000-fold magnification) of cross-sections of central parts of those are shown in FIGS. 11 and 12. As a transmission electron microscope, JEM1010 manufactured by JEOL Ltd. was used. In the same figures, a dark gray part indicates the polyethylene resin and a light gray part indicates the polystyrene resin. As shown in FIG. 11, an expanded composite resin bead 8 of the present example exhibited, at a foam cell wall part 81 thereof, a morphology (island-sea structure) in which the polyethylene resin 91 of a composite resin 80 forms a dispersed phase and the polystyrene resin 92 of the composite resin 80 forms a continuous phase. Furthermore, as shown in FIG. 12, the expanded composite resin bead 8 of the present example exhibited, also at a resin accumulation part 82 thereof, a morphology (island-sea structure) in which the polyethylene resin 91 of the composite resin 80 forms a dispersed phase and the polystyrene resin 92 of the composite resin 80 forms a continuous phase.

Comparative Example 2

In the present example, expandable composite resin beads were prepared similarly to Comparative Example 1, except for changing the amount of deionized water to 1100 g, changing the added amount of nuclear beads to 60 g, using 116 g of styrene and 12 g of butyl acrylate as the first monomer, and using 212 g of styrene as the second monomer.

Comparative Example 3

In the present example, expandable composite resin beads were prepared similarly to Comparative Example 1, except for using an ethylene-vinyl acetate copolymer ("Ultrathene 626" manufactured by Tosoh Corp.) as the polyethylene resin.

Comparative Example 4

In the present example, expandable composite resin beads were prepared similarly to Example 1, except for changing the added amount of nuclear beads to 15 g, using 15 g of butyl acrylate as the first monomer, and using 470 g of styrene as the second monomer.

Comparative Example 5

In the present example, composite resin beads not containing a blowing agent were prepared in a manner similar to Example 1, except for not adding a blowing agent in the autoclave maintained at a temperature of 125° C. for 5 hours, and cooling the autoclave to a temperature of 30° C. over the course of approximately 6 hours. More specifically, the composite resin beads of the present example have a configuration similar to the expandable composite resin beads of Example 1, except for not containing an organic physical blowing agent.

Next, 500 g of the composite resin beads prepared as described above was charged in a 5-L sealed container (pressure resistant container) equipped with a stirrer together with 3500 g of water which is a dispersion medium. Further, 5 g of kaolin as a dispersant and 0.5 g of sodium alkylbenzene sulfonate as a surfactant were added into the dispersion medium. Next, while stirring the inside of the sealed container at a stirring speed of 300 rpm, the temperature was raised to an expanding temperature of 160° C. Then, carbon dioxide ($CO_2$) which is an inorganic physical blowing agent was pressure-injected into the sealed container such that the pressure in the sealed container became 4.0 MPa (G: gage pressure), and the composite resin beads were impregnated with carbon dioxide by maintaining the same temperature (160° C.) for 15 minutes to obtain expandable composite resin beads. Next, by discharging the expandable composite resin beads out from the sealed container together with the dispersion medium to atmospheric pressure, expanded composite resin beads (primary expanded beads) having a bulk density of 33 kg/m³ were obtained.

Comparative Example 6

In the present example, first, the expanded composite resin beads (primary expanded beads) having a bulk density of 33 kg/m³ obtained in Comparative Example 5 were dried. Next, the primary expanded beads were impregnated with compressed air to obtain an internal pressure of approximately 0.26 MPa (G), and then, by performing a two-stage expanding through a contact with steam of approximately 0.04 MPa (G) for 15 seconds, expanded composite resin beads (secondary expanded beads) having a bulk density of approximately 20 kg/m³ were obtained.

Figure 13:
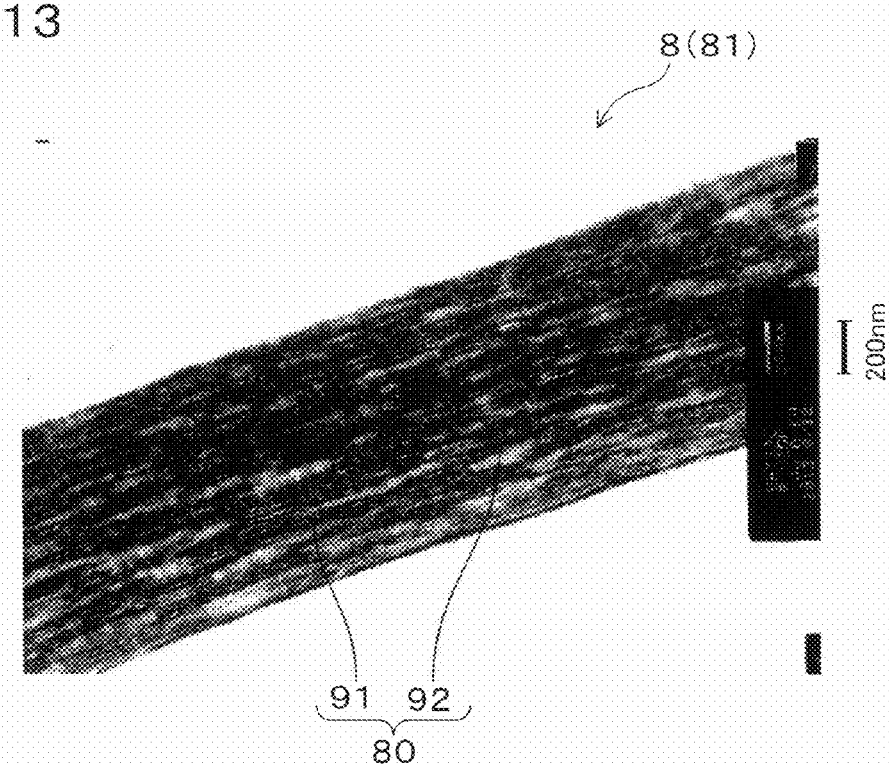
FIG. 13 shows a transmission electron microscope picture of a foam cell wall part at a cross section of a central part of an expanded composite resin bead in Comparative Example 6.
Figure 14:
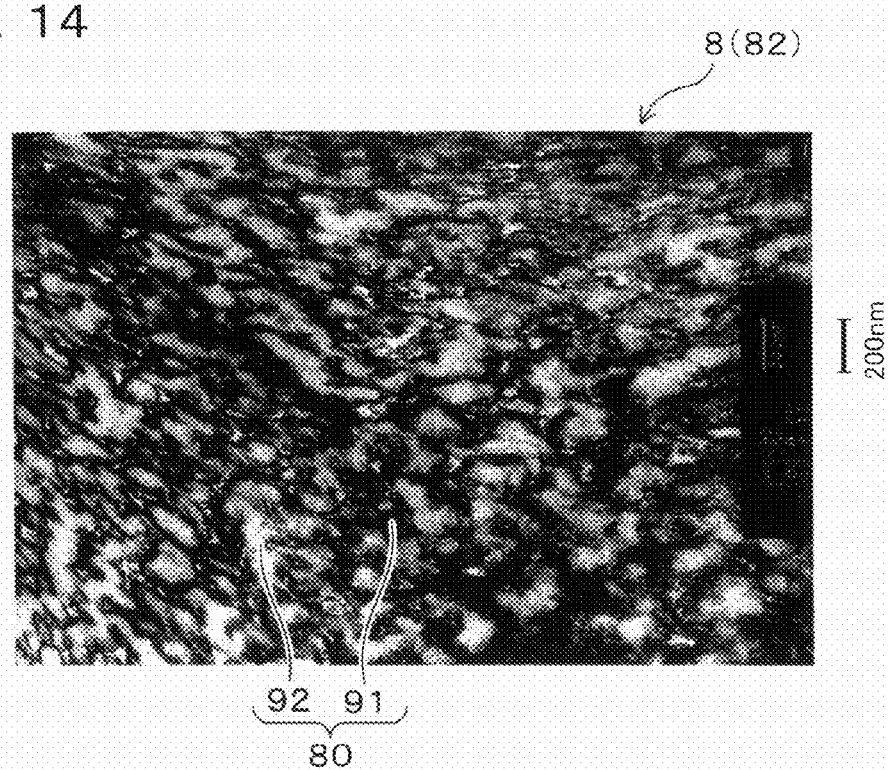
FIG. 14 shows a transmission electron microscope picture of a resin accumulation part at a cross section of a central part of an expanded composite resin bead in Comparative Example 6.

Transmission electron microscope pictures (50000-fold magnification) of cross-sections of central parts of the expanded composite resin beads obtained in the present example are shown in FIGS. 13 and 14. As a transmission electron microscope, JEM1010 manufactured by JEOL Ltd. was used. In the same figures, a dark gray to black part indicates the polyethylene resin, and a light gray part indicates the polystyrene resin. As shown in FIG. 13, the expanded composite resin bead 8 of the present example exhibited, at the foam cell wall part 81 thereof, a morphology (sea-island structure) in which the polyethylene resin 91 of the composite resin 80 forms a continuous phase and the polystyrene resin 92 of the composite resin 80 forms a dispersed phase. Furthermore, as shown in FIG. 14, the expanded composite resin bead 8 of the present example exhibited, at the resin accumulation part 82 thereof, a morphology (sea-sea structure) in which a phase formed from the polyethylene resin 91 of the composite resin 80 and a phase formed from the polystyrene resin 92 form a co-continuous phase.

RESULTS OF EXAMPLES AND COMPARATIVE EXAMPLES

For the expandable composite resin beads prepared in Examples 2 to 14 and Comparative Examples 1 to 6, polymerization conditions are shown in Tables 2 to 4 described later similarly to Example 1. In addition, for each of these expandable composite resin beads, a swelling degree, a proportion of the xylene insoluble matter, a weight average molecular weight (Mw) of the polystyrene resin, beads-life, morphology of the composite resin, and an interface ratio of PE and PS were investigated similarly to Example 1. The results are shown in Tables 2 to 4.

In addition, by using the expandable composite resin beads prepared in Examples 2 to 14 and Comparative Examples 1 to 6, expanded composite resin beads were prepared similarly to Example 1. With regard also to each of the expanded composite resin beads of Examples 2 to 14 and Comparative Examples 1 to 6, a bulk density and a swelling degree of the expanded composite resin beads were measured, and morphologies of the composite resin at a foam cell wall part and a resin accumulation part were investigated similarly to Example 1. Furthermore, by using the expanded composite resin beads of Examples 2 to 14 and Comparative Examples 1 to 6, foamed resin molded articles were prepared similarly to Example 1. Also for each of these foamed resin molded articles, similarly to Example 1, an apparent density, a 50%-compressional stress (kPa), a compression set (%), closed-cell rates (%) before and after the compression-set test, a ratio of closed-cell rates before and after the compression-set test (closed-cell rate after compression-set test/closed-cell rate before compression-set test), and a swelling degree were measured. In addition, judgment of conformity to the above described formula (1) of $C \times E$ $1000000$ $e^{-200(E/D)}$ was performed. The results are shown in Tables 2 to 4.

TABLE 1

(Table 1)

| Polyethylene resin | Olefin resin Type | Product name | Tm (° C.) | Tv (° C.) | Tm − Tv (° C.) |
|---|---|---|---|---|---|
| Resin A | mLL | Nipolon Z 9P51A | 103 | 97 | 6 |
| Resin B | mLL | Kernel KF270 | 100 | 88 | 12 |
| Resin C | mLL | Evolue SP0510 | 102 | 84 | 18 |
| Resin D | EVA | Ultrathene 626 | 90 | 65 | 25 |
| Resin E | LD | Sumikathene L716-H | 107 | 86 | 21 |
| Resin F | LL | Sumlkathene-E FV203 | 115 | 99 | 16 | mLL: a linear low density polyethylene obtained through polymerization using a metallocene polymerization catalyst
EVA: an ethylene-vinyl acetate copolymer
LD: a branched low density polyethylene
LL: a linear low density polyethylene

TABLE 2

| | | | Example 1 | Example 2 | Example 3 | Example 4 | Example 5 |
|---|---|---|---|---|---|---|---|
| Polymerization condition | Polyethylene resin nuclear bead | parts by mass | 100 | 100 | 100 | 100 | 100 |
| | Styrene monomer  First monomer | parts by mass | 100 | 100 | 100 | 100 | 100 |
| | Styrene monomer  Second monomer | parts by mass | 467 | 300 | 600 | 800 | 1800 |
| | Total added amount | parts by mass | 567 | 400 | 700 | 900 | 1900 |
| | Type of polyethylene resin | — | | | Resin A | | |
| | Mass ratio (First monomer/ Polyethylene resin nuclear bead) | — | | | 1.0 | | |
| | Amount of polymerization initiator | mass % | | | 0.34 | | |
| | Change of temperature control during polymerization | ° C. | | | 100 → 125° C. | | |
| | Type of blowing agent | — | | | CH | | |
| Expandable composite resin bead | Polyethylene resin | mass % | 14 | 19 | 12 | 10 | 5 |
| | Polystyrene resin | mass % | 86 | 81 | 88 | 90 | 95 |
| | Swelling degree | — | 3.35 | 2.16 | 3.52 | 2.59 | 1.71 |
| | Proportion of xylene insoluble matter | mass % | 26 | 30 | 21 | 10 | 2 |
| | Mw of polystyrene resin | ×10⁴ | 48 | 44 | 53 | 39 | 44 |
| | Beads-life | days | 1.2 | 0.65 | 1.3 | 2 | 14 |
| | Morphology | — | sea-island | sea-island | sea-island | sea-island | sea-sea |
| | Interface ratio of PE and PS | μm/μm² | 19.5 | 23.7 | 18.9 | 17.4 | 15.1 |
| Expanded composite resin bead | Bulk density | kg/m³ | 20 | 20 | 20 | 20 | 20 |
| | Swelling degree | — | 3.33 | 2.13 | 3.50 | 2.60 | 1.73 |
| | Morphology  Foam cell wall part | — | island-sea | island-sea | island-sea | island-sea | island-sea |
| | Morphology  Resin accumulation part | — | sea-island | sea-island | sea-island | sea-island | sea-island |
| Foamed resin molded article | Apparent density | kg/m³ | 20 | 20 | 20 | 20 | 20 |
| | 50%-compressive stress | kPa | 220 | 210 | 225 | 230 | 220 |
| | Compression set | % | 4.7 | 6.5 | 3.8 | 5.4 | 8.3 |
| | Closed-cell rate (before test) | % | 87 | 89 | 87 | 90 | 86 |
| | Closed-cell rate (after test) | % | 81 | 83 | 84 | 84 | 77 |
| | Ratio of closed-cell rates (after test/before test) | — | 0.94 | 0.93 | 0.96 | 0.93 | 0.89 |
| | Swelling degree | — | 3.36 | 2.15 | 3.55 | 2.58 | 1.73 |
| | Conformity to formula (1) | — | conformance | conformance | conformance | conformance | conformance |

| | | | Example 6 | Example 7 | Example 8 | Example 9 | Example 10 |
|---|---|---|---|---|---|---|---|
| Polymerization condition | Polyethylene resin nuclear bead | parts by mass | 100 | 100 | 100 | 100 | 100 |
| | Styrene monomer  First monomer | parts by mass | 100 | 100 | 100 | 100 | 100 |
| | Styrene monomer  Second monomer | parts by mass | 467 | 467 | 467 | 467 | 467 |
| | Total added amount | parts by mass | 567 | 567 | 567 | 567 | 567 |
| | Type of polyethylene resin | — | Resin B | Resin C | Resin D | Resin E | Resin F |
| | Mass ratio (First monomer/ Polyethylene resin nuclear bead) | — | | | 1.0 | | |
| | Amount of polymerization initiator | mass % | | | 0.34 | | |
| | Change of temperature control during polymerization | ° C. | | | 100 → 125° C. | | |
| | Type of blowing agent | — | | | CH | | |
| Expandable composite resin bead | Polyethylene resin | mass % | 14 | 14 | 14 | 14 | 14 |
| | Polystyrene resin | mass % | 86 | 86 | 86 | 86 | 86 |
| | Swelling degree | — | 2.45 | 1.83 | 2.75 | 2.86 | 3.18 |
| | Proportion of xylene insoluble matter | mass % | 20 | 29 | 39 | 34 | 27 |
| | Mw of polystyrene resin | ×10⁴ | 45 | 52 | 52 | 49 | 57 |

TABLE 2-continued

|  |  |  |  |  |  |  |  |
|---|---|---|---|---|---|---|---|
|  | Beads-life | days | 1 | 0.9 | 0.4 | 0.85 | 0.35 |
|  | Morphology | — | sea-island | sea-island | sea-island | sea-island | sea-island |
|  | Interface ratio of PE and PS | μm/μm² | 20.5 | 21.5 | 28.2 | 23.0 | 28.0 |
| Expanded | Bulk density | kg/m³ | 20 | 20 | 20 | 20 | 20 |
| composite | Swelling degree | — | 2.45 | 1.80 | 2.75 | 2.88 | 3.20 |
| resin bead | Morphology Foam cell wall part | — | island-sea | island-sea | island-sea | island-sea | island-sea |
|  | Resin accumulation part | — | sea-island | sea-island | sea-island | sea-island | sea-island |
| Foamed | Apparent density | kg/m³ | 20 | 20 | 20 | 20 | 20 |
| resin molded article | 50%-compressive stress | kPa | 200 | 220 | 210 | 220 | 220 |
|  | Compression set | % | 6.8 | 8.4 | 5.8 | 4.6 | 4.5 |
|  | Closed-cell rate (before test) | % | 89 | 89 | 88 | 89 | 88 |
|  | Closed-cell rate (after test) | % | 83 | 80 | 83 | 83 | 85 |
|  | Ratio of closed-cell rates (after test/before test) | — | 0.93 | 0.90 | 0.94 | 0.94 | 0.97 |
|  | Swelling degree | — | 2.46 | 1.85 | 2.75 | 2.86 | 3.15 |
|  | Conformity to formula (1) | — | conformance | conformance | conformance | conformance | conformance |

TABLE 3

|  |  |  | Example No. | | | |
|---|---|---|---|---|---|---|
|  |  |  | Example 11 | Example 12 | Example 13 | Example 14 |
| Polymerization | Polyethylene resin nuclear bead | parts by mass | 100 | 100 | 100 | 100 |
| condition | Styrene First monomer | parts by mass | 100 | 100 | 100 | 100 |
|  | monomer Second monomer | parts by mass | 467 | 467 | 467 | 467 |
|  | Total added amount | parts by mass | 567 | 567 | 567 | 567 |
|  | Type of polyethylene resin | — | Resin A | | | |
|  | Mass ratio (First monomer/ Polyethylene resin nuclear bead) | — | 1.0 | | | |
|  | Amount of polymerization initiator | mass % | 0.17 | 0.52 | 0.34 | |
|  | Change of temperature control during polymerization | °C. | 100 → 125° C. | | | |
|  | Type of blowing agent | — | CH | | | |
| Expandable | Polyethylene resin | mass % | 14 | 14 | 14 | 14 |
| composite | Polystyrene resin | mass % | 86 | 86 | 86 | 86 |
| resin bead | Swelling degree | — | 3.22 | 2.22 | 3.35 | 3.35 |
|  | Proportion of xylene insoluble matter | mass % | 0 | 36 | 26 | 26 |
|  | Mw of polystyrene resin | ×10⁴ | 47 | 36 | 48 | 48 |
|  | Morphology | — | sea-island | sea-island | sea-island | sea-island |
|  | Beads-life | days | 0.7 | 1.1 | 1.2 | 1.2 |
|  | Interface ratio of PE and PS | μm/μm² | 22.0 | 19.0 | 19.5 | 19.5 |
| Expanded | Bulk density | kg/m³ | 20 | 20 | 33 | 10 |
| composite | Swelling degree | — | 3.22 | 2.25 | 3.33 | 3.33 |
| resin bead | Morphology Foam cell wall part | — | island-sea | island-sea | island-sea | island-sea |
|  | Resin accumulation part | — | sea-island | sea-island | sea-island | sea-island |
| Foamed | Apparent density | kg/m³ | 20 | 20 | 33 | 10 |
| resin molded | 50%-compressive stress | kPa | 220 | 220 | 320 | 150 |
| article | Compression set | % | 4.5 | 7.0 | 7.0 | 3.0 |
|  | Closed-cell rate (before test) | % | 88 | 87 | 89 | 85 |
|  | Closed-cell rate (after test) | % | 84 | 79 | 81 | 83 |
|  | Ratio of closed-cell rates (after test/before test) | — | 0.95 | 0.92 | 0.91 | 0.97 |
|  | Swelling degree | — | 3.25 | 2.22 | 3.36 | 3.36 |
|  | Conformity to formula (1) | — | conformance | conformance | conformance | conformance |

TABLE 4

|  |  |  | Comparative Example 1 | Comparative Example 2 | Comparative Example 3 |
|---|---|---|---|---|---|
| Polymerization condition | Polyethylene resin nuclear bead | parts by mass | 100 | 100 | 100 |
|  | Styrene monomer — First monomer | parts by mass | 200 | 213 | 200 |
|  | Styrene monomer — Second monomer | parts by mass | 200 | 353 | 200 |
|  | Total added amount | parts by mass | 400 | 567 | 400 |
|  | Type of polyethylene resin | — | Resin A | Resin A | Resin D |
|  | Mass ratio (First monomer/ Polyethylene resin nuclear bead) | — | 2.0 | 2.1 | 2.0 |
|  | Amount of polymerization initiator | mass % | | 0.95 | |
|  | Change of temperature control during polymerization | °C. | | 88 → 80 → 125° C. | |
|  | Type of blowing agent | — | | CH | |
| Expandable composite resin bead | Polyethylene resin | mass % | 19 | 14 | 19 |
|  | Polystyrene resin | mass % | 81 | 86 | 81 |
|  | Swelling degree | — | 1.04 | 1.03 | 1.03 |
|  | Proportion of xylene insoluble matter | mass % | 10 | 12 | 10 |
|  | Mw of polystyrene resin | ×10$^4$ | 29 | 29 | 24 |
|  | Beads-life | days | 0.65 | 1.2 | 0.15 |
|  | Morphology | — | sea-sea | island-sea | sea-sea |
|  | Interface ratio of PE and PS | μm/μm$^2$ | 4.0 | 3.5 | 32.0 |
| Expanded composite resin bead | Bulk density | kg/m$^3$ | 20 | 20 | 20 |
|  | Swelling degree | — | 1.05 | 1.04 | 1.03 |
|  | Morphology — Foam cell wall part | — | island-sea | island-sea | island-sea |
|  | Morphology — Resin accumulation part | — | island-sea | island-sea | island-sea |
| Foamed resin molded article | Apparent density | kg/m$^3$ | 20 | 20 | 20 |
|  | 50%-compressive stress | kPa | 210 | 210 | 200 |
|  | Compression set | % | 15.0 | 16.0 | 16.0 |
|  | Closed-cell rate (before test) | % | 90 | 88 | 89 |
|  | Closed-cell rate (after test) | % | 75 | 71 | 74 |
|  | Ratio of closed-cell rates (after test/before test) | — | 0.84 | 0.80 | 0.83 |
|  | Swelling degree | — | 1.06 | 1.03 | 1.02 |
|  | Conformity to formula (1) | — | non-conformance | non-conformance | non-conformance |

|  |  |  | Comparative Example 4 | Comparative Example 5 | Comparative Example 6 |
|---|---|---|---|---|---|
| Polymerization condition | Polyethylene resin nuclear bead | parts by mass | 100 | 100 | 100 |
|  | Styrene monomer — First monomer | parts by mass | 100 | 100 | 100 |
|  | Styrene monomer — Second monomer | parts by mass | 3133 | 467 | 467 |
|  | Total added amount | parts by mass | 3233 | 567 | 567 |
|  | Type of polyethylene resin | — | Resin A | Resin A | Resin A |
|  | Mass ratio (First monomer/ Polyethylene resin nuclear bead) | — | 1.0 | 1.0 | 1.0 |
|  | Amount of polymerization initiator | mass % | | 0.34 | |
|  | Change of temperature control during polymerization | °C. | | 100 → 125° C. | |
|  | Type of blowing agent | — | CH | CO$_2$ | CO$_2$ |
| Expandable composite resin bead | Polyethylene resin | mass % | 3 | 14 | 14 |
|  | Polystyrene resin | mass % | 97 | 86 | 86 |
|  | Swelling degree | — | 1.20 | 3.35 | 3.35 |
|  | Proportion of xylene insoluble matter | mass % | 9 | 26 | 26 |
|  | Mw of polystyrene resin | ×10$^4$ | 46 | 48 | 48 |
|  | Beads-life | days | 14 | — | — |
|  | Morphology | — | island-sea | sea-island | sea-island |
|  | Interface ratio of PE and PS | μm/μm$^2$ | 13.0 | 19.5 | 19.5 |
| Expanded composite resin bead | Bulk density | kg/m$^3$ | 20 | 33 | 20 |
|  | Swelling degree | — | 1.20 | 3.33 | 3.33 |
|  | Morphology — Foam cell wall part | — | island-sea | sea-island | sea-island |
|  | Morphology — Resin accumulation part | — | island-sea | sea-sea | sea-sea |
| Foamed resin molded article | Apparent density | kg/m$^3$ | 20 | 33 | 20 |
|  | 50%-compressive stress | kPa | 205 | 310 | 210 |
|  | Compression set | % | 11.1 | 20 | 17 |
|  | Closed-cell rate (before test) | % | 84 | 85 | 86 |
|  | Closed-cell rate (after test) | % | 70 | 68 | 64 |
|  | Ratio of closed-cell rates (after test/before test) | — | 0.84 | 0.80 | 0.74 |
|  | Swelling degree | — | 1.18 | 3.36 | 3.36 |
|  | Conformity to formula (1) | — | non-conformance | non-conformance | non-conformance |

As can be understood from Tables 1 to 4, by adjusting the swelling degree and the compositions of the polystyrene resin and the polyethylene resin in the expandable composite resin beads as in Examples 1 to 14, foamed resin molded articles having low compression set and excellent restorability while having excellent rigidity were obtained.

On the other hand, the expandable composite resin beads of Comparative Example 1 to 4 had small swelling degrees, and the foamed resin molded articles obtained from Comparative Examples 1 to 4 had high compression set and insufficient restorability. Furthermore, the expanded composite resin beads of Comparative Examples 5 and 6 obtained using, as a blowing agent, carbon dioxide ($CO_2$) which is an inorganic physical blowing agent had insufficient restorability.

What is claimed is:

1. An expandable composite resin bead comprising: a composite resin containing a polyethylene resin and a polystyrene resin; and a blowing agent impregnated in the composite resin, wherein
the composite resin contains the polyethylene resin by 5 to 20 mass % and the polystyrene resin by 80 to 95 mass %, based on 100 mass % of a total of the polyethylene resin and the polystyrene resin,
the blowing agent is an organic physical blowing agent, and
a swelling degree, in methyl ethyl ketone at a temperature of 23° C., of a mixed insoluble matter of a xylene insoluble matter obtained through Soxhlet extraction of the expandable composite resin bead using xylene and an acetone insoluble matter contained in a xylene solution after the Soxhlet extraction, is not lower than 1.25.

2. The expandable composite resin bead according to claim 1, wherein the composite resin contains the polyethylene resin by 5 to 17 mass % and the polystyrene resin by 83 to 95 mass %, based on 100 mass % of a total of the polyethylene resin and the polystyrene resin.

3. The expandable composite resin bead according to claim 1, wherein the polyethylene resin comprises a linear low density polyethylene whose difference between melting point and Vicat softening temperature is not higher than 20° C.

4. The expandable composite resin bead according to claim 1, wherein the swelling degree is 1.25 to 10.00.

5. The expandable composite resin bead according to claim 1, wherein the swelling degree is 1.50 to 5.00.

6. The expandable composite resin bead according to claim 1, wherein a weight ratio of the xylene insoluble matter is from 0 to 40%.

7. The expandable composite resin bead according to claim 1, wherein the polyethylene resin forms a continuous phase and the polystyrene resin forms a dispersed phase in the composite resin.

8. The expandable composite resin bead according to claim 1, wherein an interface ratio of the polyethylene resin and the polystyrene resin at a cross section of the expandable composite resin bead is larger than 6 $\mu m/\mu m^2$ but not larger than 50 $\mu m/\mu m^2$.

9. The expandable composite resin bead according to claim 1, wherein a weight ratio of the xylene insoluble matter is from 5 to 35%.

10. The expandable composite resin bead according to claim 1, wherein a weight ratio of the xylene insoluble matter is from 10 to 30%.

11. The expandable composite resin bead according to claim 1, wherein the organic physical blowing agent is a saturated hydrocarbon compound having a carbon number of 3 to 6.

12. The expandable composite resin bead according to claim 1, wherein the organic physical blowing agent is a mixture of 30 to 80 mass % of isobutane and 20 to 70 mass % of a hydrocarbon having a carbon number of 4 to 6 other than isobutane, based on 100 mass % of a total of isobutene and the hydrocarbon other than isobutane.

13. The expandable composite resin bead according to claim 1, wherein a content of the blowing agent in the expendable composite resin is from 3 to 10 mass %.

14. The expandable composite resin bead according to claim 1, wherein a content of the blowing agent in the expendable composite resin is from 4 to 9 mass %.

* * * * *